United States Patent
Canfield et al.

(10) Patent No.: US 12,422,328 B2
(45) Date of Patent: *Sep. 23, 2025

(54) APPARATUS AND METHOD FOR MEASURING IMBALANCE FORCES OF A TIRE/HUB ASSEMBLY OF A VEHICLE DURING MOTION OF THE VEHICLE

(71) Applicant: NVH Technology LLC, Coatesville, PA (US)

(72) Inventors: Eric L. Canfield, Downingtown, PA (US); David M. Scribner, Lutherville-Timonium, MD (US); Scott J. Soma, Media, PA (US); Robert P. Alston, Exton, PA (US); David A. Fenimore, Coatesville, PA (US); Zoe Kane, Greer, SC (US); Rachel Foster, Coatesville, PA (US); Meer Gujral, Chester Springs, PA (US); Joseph H. Cottingham, Downingtown, PA (US); Saahas S. Yechuri, Downingtown, PA (US); Aron Sun, Exton, PA (US); Ethan Reiland, Downingtown, PA (US); Anish Sudini, Exton, PA (US); Amish Saini, Exton, PA (US); William Liao, Downingtown, PA (US); Rohan Epur, Chester Springs, PA (US); Ryan M. Larue, Coatesville, PA (US); Brandon T. Fanti, Coatesville, PA (US)

(73) Assignee: NVH TECHNOLOGY LLC, Coatesville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,735

(22) Filed: May 10, 2024

(65) Prior Publication Data

US 2024/0410777 A1 Dec. 12, 2024

Related U.S. Application Data

(63) Continuation of application No. 17/704,493, filed on Mar. 25, 2022, now Pat. No. 11,982,586, which is a
(Continued)

(51) Int. Cl.
*G01M 1/28* (2006.01)
*G01M 17/02* (2006.01)

(52) U.S. Cl.
CPC ............ *G01M 1/28* (2013.01); *G01M 17/022* (2013.01)

(58) Field of Classification Search
None
See application file for complete search history.

(56) References Cited

U.S. PATENT DOCUMENTS

| | | | |
|---|---|---|---|
| 3,888,128 A | 6/1975 | Mitchell | |
| 5,443,537 A | 8/1995 | Haskins | |

(Continued)

FOREIGN PATENT DOCUMENTS

DE 20018414 U1 1/2001

OTHER PUBLICATIONS

Product brochure for Road Force Elite® wheel balancer, Hunter Engineering Company, Copyright © 2018, 16 pages.
(Continued)

*Primary Examiner* — Michael J Dalbo
*Assistant Examiner* — Denise R Karavias
(74) *Attorney, Agent, or Firm* — Panitch Schwarze Belisario & Nadel LLP

(57) ABSTRACT

An apparatus configured to be removably attached to a tire/hub assembly of a vehicle via lug nuts of the tire/hub assembly is used to determine imbalance forces of the tire/hub assembly during motion of the vehicle. The apparatus includes a disk and a plurality of cup-shaped objects
(Continued)

fixed at one end to the disk and extending perpendicularly outward from the disk. The plurality of cup-shaped objects are arranged a fixed radial distance from a radial center of the disk in a pattern that matches the lug nuts of the tire/hub assembly. The apparatus is mounted to the vehicle's tire/hub assembly by fitting the plurality of cup-shaped objects over the lug nuts of the tire/hub assembly. The apparatus further includes three inertial measurement units (IMU's) mounted to the disk to measure parameters that are used for calculating the imbalance forces during motion of the vehicle. A method for collecting measurement parameters related to imbalance forces of a tire/hub assembly of a vehicle during motion of the vehicle on a road surface by using the apparatus is also described.

12 Claims, 31 Drawing Sheets

Related U.S. Application Data continuation of application No. 17/221,139, filed on Apr. 2, 2021, now Pat. No. 11,287,348, which is a continuation of application No. 16/557,154, filed on Aug. 30, 2019, now Pat. No. 10,969,292.

(56) References Cited

U.S. PATENT DOCUMENTS

| | | | |
|---|---|---|---|
| 6,595,053 B2 | 7/2003 | Parker | |
| 6,600,999 B2 | 7/2003 | Clark et al. | |
| 6,622,389 B1 | 9/2003 | Pellegrino | |
| 6,768,551 B2 | 7/2004 | Mian et al. | |
| 7,117,603 B1 | 10/2006 | Pellegrino | |
| 7,164,264 B2 | 1/2007 | Anderson et al. | |
| 7,213,789 B1 | 5/2007 | Matzan | |
| 7,478,482 B1 | 1/2009 | Pellegrino | |
| 7,578,066 B1 | 8/2009 | Pellegrino | |
| 7,705,743 B2 | 4/2010 | Barone et al. | |
| 7,926,189 B1* | 4/2011 | Pellegrino | B60B 29/001 33/203.18 |
| 8,305,567 B2 | 11/2012 | Hesser et al. | |
| 9,387,734 B1 | 7/2016 | Alhazmi | |
| 9,645,037 B2 | 5/2017 | Meyer et al. | |
| 9,771,090 B2 | 9/2017 | Warta et al. | |
| 9,981,671 B2 | 5/2018 | Fraser et al. | |
| 9,989,498 B2 | 6/2018 | Lanza di Scalea et al. | |
| 10,040,463 B2 | 8/2018 | Singh | |
| 10,124,819 B2 | 11/2018 | Ghosh et al. | |
| 10,284,752 B1 | 5/2019 | Canfield et al. | |
| 10,442,449 B2 | 10/2019 | Singh | |
| 10,543,861 B1 | 1/2020 | Bartek et al. | |
| 10,752,271 B2 | 8/2020 | Chung et al. | |
| 10,953,899 B2 | 3/2021 | Chung et al. | |
| 10,969,292 B2 | 4/2021 | Canfield et al. | |
| 10,989,694 B2 | 4/2021 | Kawabata et al. | |
| 11,001,283 B2 | 5/2021 | Dick et al. | |
| 11,259,007 B2 | 2/2022 | Mesher | |
| 11,287,348 B2 | 3/2022 | Canfield et al. | |
| 11,480,999 B2 | 10/2022 | Foo et al. | |
| 11,656,156 B1 | 5/2023 | Buchanan et al. | |
| 11,731,673 B1 | 8/2023 | Buchanan et al. | |
| 2004/0162680 A1 | 8/2004 | Shiraishi | |
| 2005/0247130 A1 | 11/2005 | Takada et al. | |
| 2006/0010992 A1 | 1/2006 | Shima et al. | |
| 2008/0185106 A1 | 8/2008 | Farley et al. | |
| 2009/0314075 A1 | 12/2009 | Albohr et al. | |
| 2010/0139397 A1 | 6/2010 | Braghiroli et al. | |
| 2010/0288030 A1 | 11/2010 | Shin et al. | |
| 2011/0270564 A1 | 11/2011 | Feero | |
| 2013/0073224 A1 | 3/2013 | Oblizajek et al. | |
| 2014/0191525 A1 | 7/2014 | Ruebusch et al. | |
| 2015/0221144 A1* | 8/2015 | Kourtev | G07C 5/0808 701/34.4 |
| 2017/0350684 A1* | 12/2017 | Maliszewski | G01B 5/255 |
| 2018/0003591 A1 | 1/2018 | Renegar et al. | |
| 2018/0029410 A1 | 2/2018 | Makary | |
| 2019/0064027 A1 | 2/2019 | Leone et al. | |
| 2019/0092106 A1 | 3/2019 | Abdossalami et al. | |
| 2020/0033220 A1* | 1/2020 | Raad | G01M 17/013 |
| 2020/0385036 A1 | 12/2020 | Schwarz et al. | |
| 2021/0061027 A1 | 3/2021 | Da Deppo et al. | |
| 2021/0063267 A1 | 3/2021 | Canfield et al. | |
| 2021/0181063 A1 | 6/2021 | Dodani et al. | |
| 2021/0256782 A1 | 8/2021 | Ehlers | |

OTHER PUBLICATIONS

Ford F150 2004-2014 Center Cap, Copyright © 2019 centercaps. net, 2 pages.
International Search Report and Written Opinion issued Oct. 27, 2020 in International Application No. PCT/US2020/044692.
Bee Line, on vehicle wheel balancing, www.beeline-co.com/products/wheel-balancing, 2 pages (2021).
Tru Align: The Universal Wheel Alignment Adapter Kit. Printout from Wayback Machine web page: <https://web.archive.org/web/20190820155325/https://trualign.com/>, printout date: Apr. 1, 2021, web page captured on Aug. 20, 2019, 10 pages.
International Preliminary Report on Patentability issued Aug. 25, 2021 in International Application No. PCT/US2020/044692.
Bee Line, on vehicle wheel balancing, www.beeline-co.com/products/wheel-balancing, 5 pages (2021).
Notice of Allowance issued Jan. 19, 2023 in U.S. Appl. No. 17/952,782.
Extended European Search Report for EP20856396.5, maildate: Sep. 4, 2023.
Pending claims 1-16 of EP20085396.5, 4 pages.
Notice of Allowance issued Mar. 28, 2024 in U.S. Appl. No. 17/704,493.

* cited by examiner

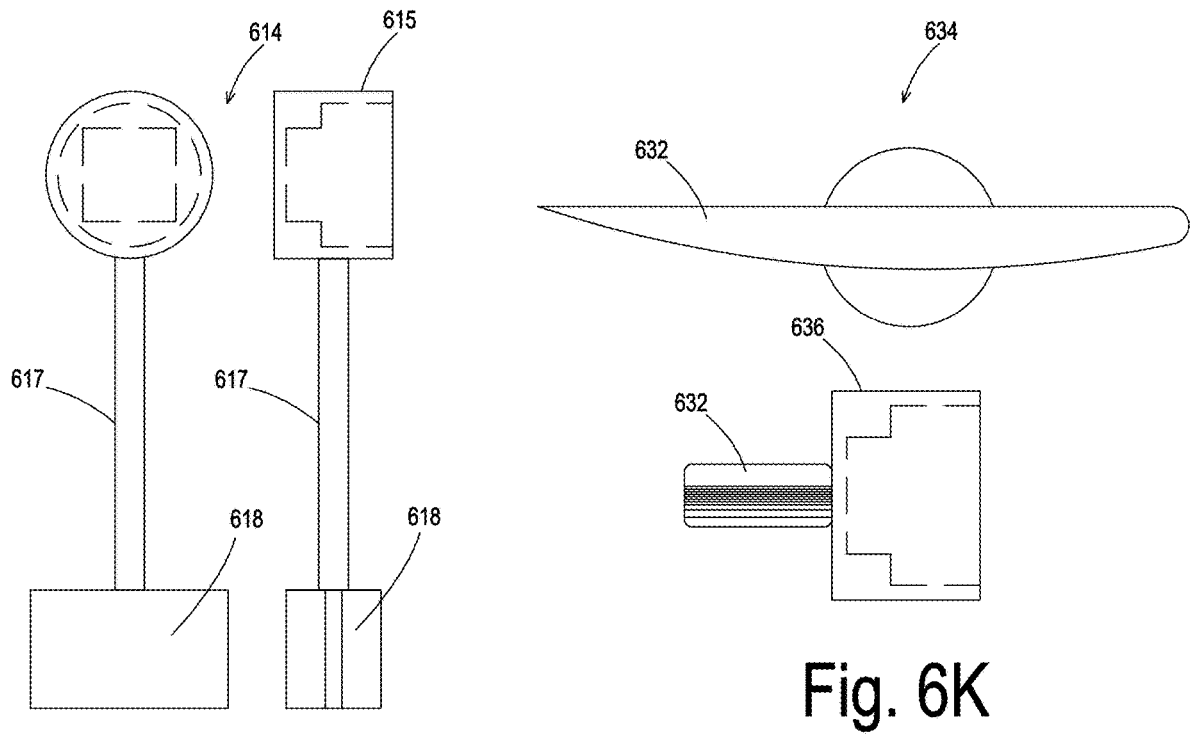
Fig. 6J
Fig. 6K
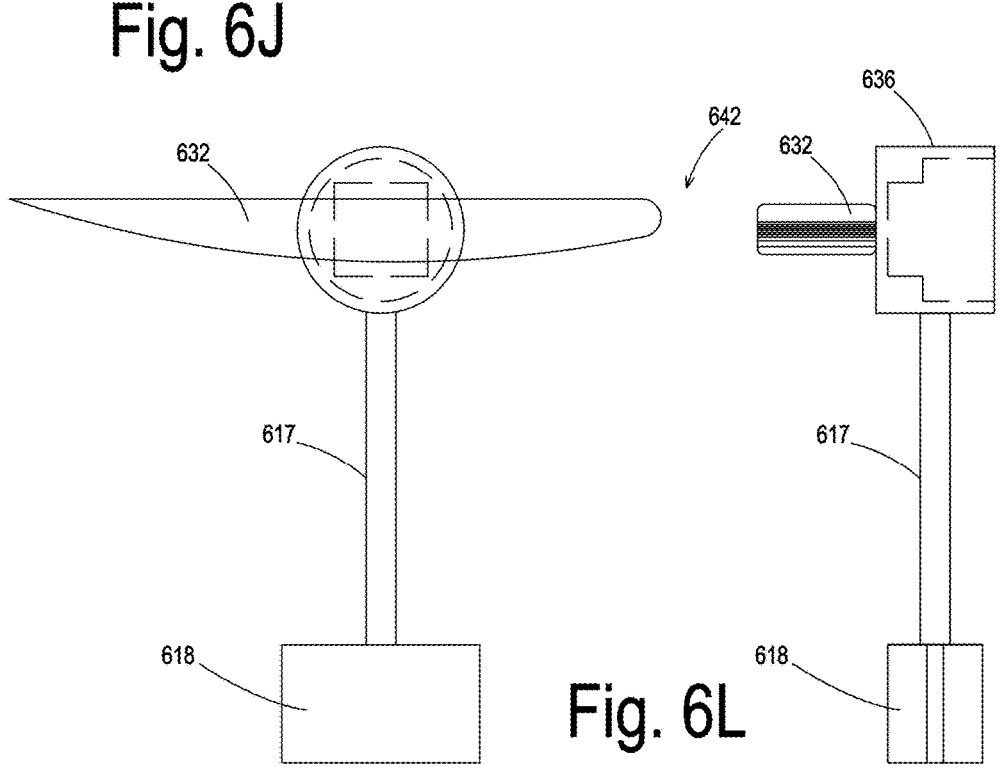
Fig. 6L

APPARATUS AND METHOD FOR MEASURING IMBALANCE FORCES OF A TIRE/HUB ASSEMBLY OF A VEHICLE DURING MOTION OF THE VEHICLE

CROSS-REFERENCE TO RELATED APPLICATIONS

This application is a continuation of copending U.S. application Ser. No. 17/704,493 filed Mar. 25, 2022, which, in turn, is a continuation of U.S. application Ser. No. 17/221,139 filed Apr. 2, 2021, now U.S. Pat. No. 11,287,348, which, in turn, is a continuation of U.S. application Ser. No. 16/557,154 filed Aug. 30, 2019, now U.S. Pat. No. 10,969,292, each of which are incorporated by reference herein.

BACKGROUND OF THE INVENTION

"Tire balance" refers to distribution of mass within a vehicle tire or the entire wheel, including the rim, on which the vehicle tire is mounted. Tire balance may also be referred to as "tire unbalance" or "tire imbalance." As described in U.S. Pat. No. 6,595,053 (Parker), which is incorporated by reference herein, the balancing of vehicle wheel assemblies is most often accomplished by removing the tire/wheel assemblies from the vehicle and mounting each of the tire/wheel assemblies on an off-car-balancer. The off-car balancer rotates the tire/wheel assembly, measures the imbalance forces and displays the amount and location of weight to add to the wheel to bring the tire/wheel assembly into a balanced condition. One example of an off-car balancer is The Road Force® Elite wheel balancer, which is commercially available from Hunter Engineering Company, Bridgeton, Missouri.

As also described in U.S. Pat. No. 6,595,053, a tire/wheel assembly may be balanced so that it produces negligible forces when rotated on the off-car balancer, but the same assembly may cause significant imbalance forces when mounted on the vehicle and rotated using the vehicle's bearings and axle. The imbalance forces of a tire/wheel assembly will remain constant between the off-car balancer and the vehicle only if the relationship between the tire/wheel assembly and the axis of rotation is the same for the two mountings. Achieving the desired on-car wheel balance with only an off-car balancer involves both accurately mounting the wheel on the balancer and then accurately mounting the tire/wheel assembly on the vehicle's hub. Possible causes of wheel-to-vehicle mounting inaccuracy include clearance between the balancer hub and the rim pilot hole, runout of the hub pilot diameter or mounting face, rust or grime between rim and vehicle hub, runout in studs and runout in lug nuts.

As further described in U.S. Pat. No. 6,595,053, on-car balancers can eliminate some of the mounting accuracy problems by performing the balance measurements after the tire/wheel assembly is in its final mounted position on the vehicle. Although on-car balancers are available, they are not very popular because of setup difficulties, operational limitations, and safety issues.

Despite the many efforts made by the industry, including those described in U.S. Pat. No. 6,595,053, there still remains an unmet need for an on-car balancer that is inexpensive, convenient to use, and which can capture parameters necessary for calculating imbalance forces when the vehicle is actually in motion. The present invention fulfills such a need.

SUMMARY OF THE PRESENT INVENTION

In one preferred embodiment, the present invention provides an apparatus configured to be removably attached to a tire/hub assembly of a vehicle via lug nuts of the tire/hub assembly for use in determining imbalance forces of the tire/hub assembly during motion of the vehicle. The apparatus includes a disk, a plurality of cup-shaped objects, and one or more inertial measurement units (IMU's). Each cup-shaped object is rigidly fixed at one end to the disk and extends perpendicularly outward from the disk. The plurality of cup-shaped objects are arranged a fixed radial distance from the radial center of the disk in a pattern that matches the lug nuts of the tire/hub assembly. Each cup-shaped object is hollow along at least a portion of its length that is distal from the disk. The hollow portion has a diameter that is larger than a diameter of the lug nuts of the tire/hub assembly so as to allow the apparatus to be mounted to the vehicle's tire/hub assembly by fitting the plurality of cup-shaped objects over the lug nuts of the tire/hub assembly. The one or more IMU's are mounted to the disk and are configured to measure parameters that are used for calculating the imbalance forces during motion of the vehicle. One or more of the cup-shaped objects may include a magnet fixedly mounted at an end of the cup-shaped objects that is proximate to the disk so as to magnetically engage with one of the lug nuts when the apparatus is attached to the tire/hub assembly of a vehicle, and thereby inhibit the apparatus from coming off of the vehicle when the vehicle is in motion.

BRIEF DESCRIPTION OF THE DRAWINGS

Preferred embodiments of the present invention will now be described by way of example with reference to the accompanying drawings:

FIGS. 6A-6L show alternative embodiments of the present invention having a floating center shaft assembly and a single IMU mounted to a radial center of the floating center shaft assembly.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

Figure 3A:
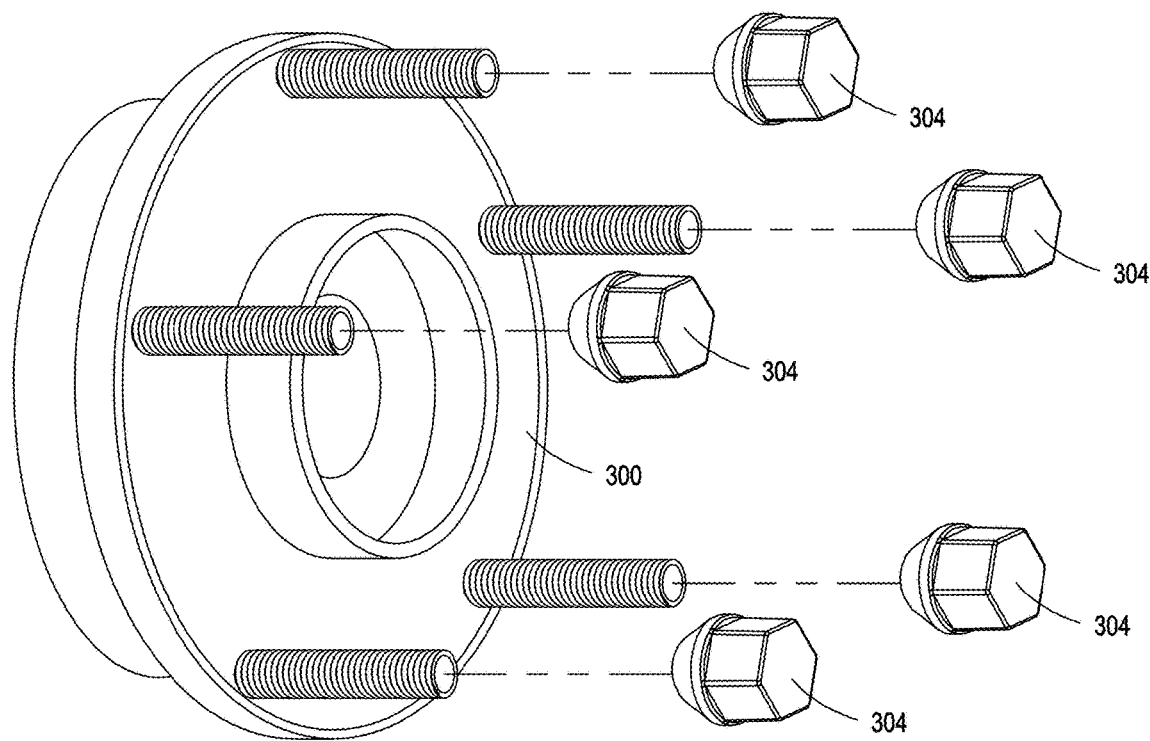
FIG. 3A shows prior art tire/hub assemblies.
Figure 3A:
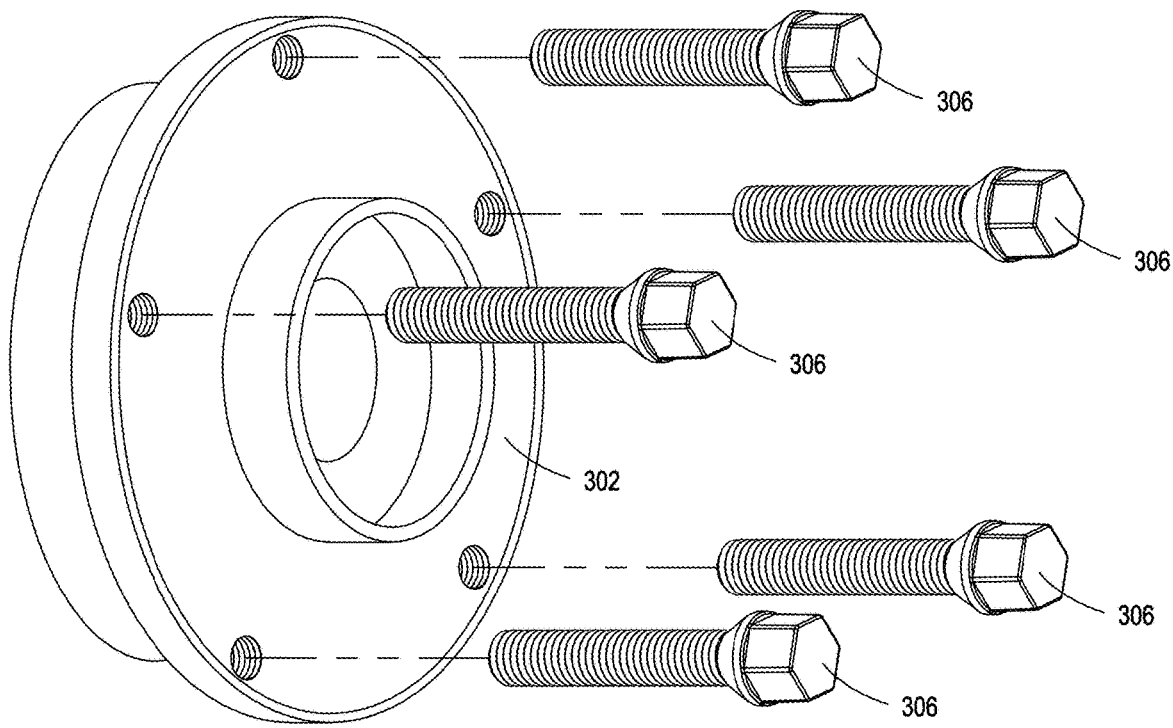
Figure 3B:
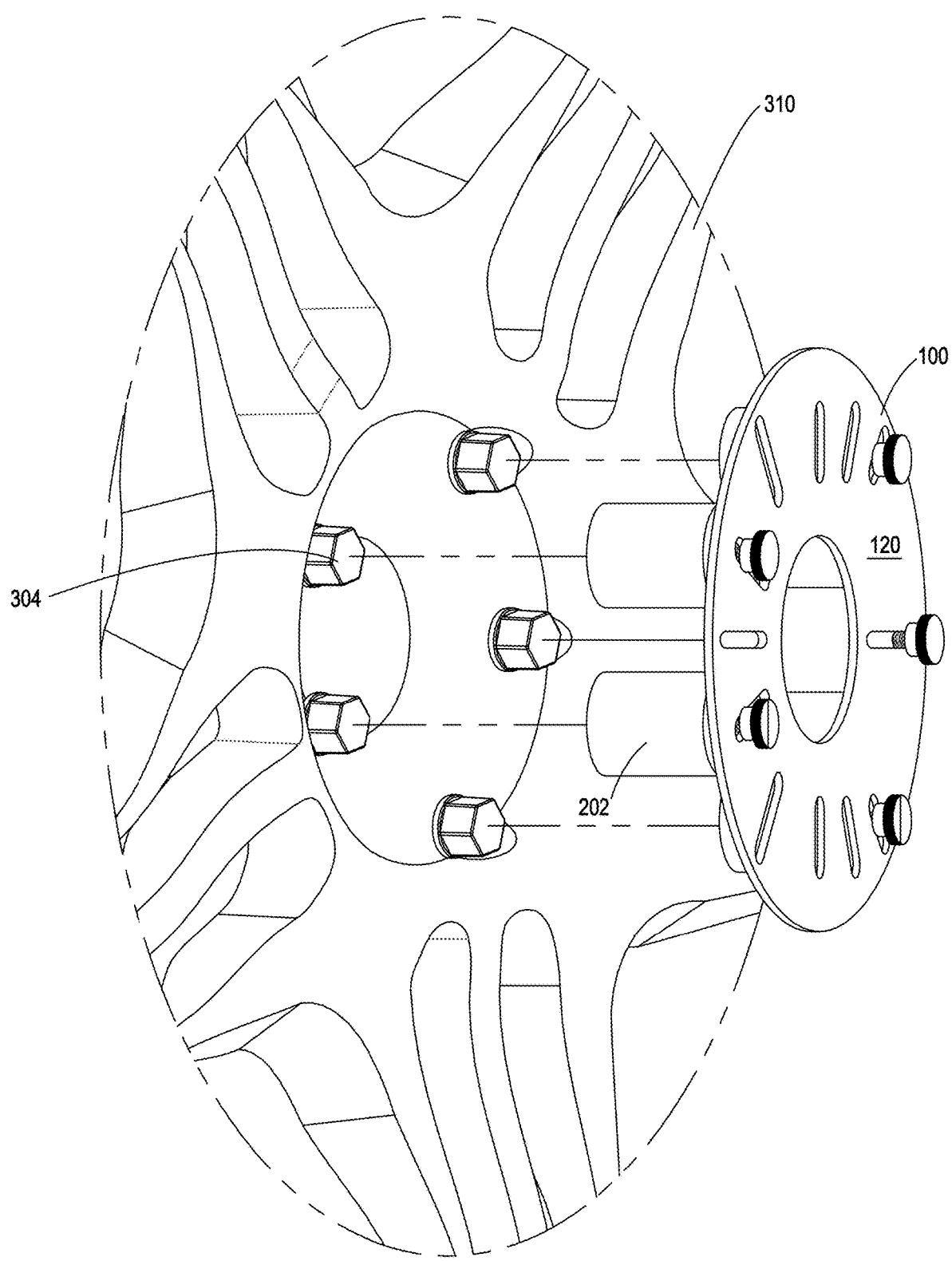
FIGS. 3B and 3C show how the apparatus of the present invention engages a tire/hub assembly.
Figure 3C:
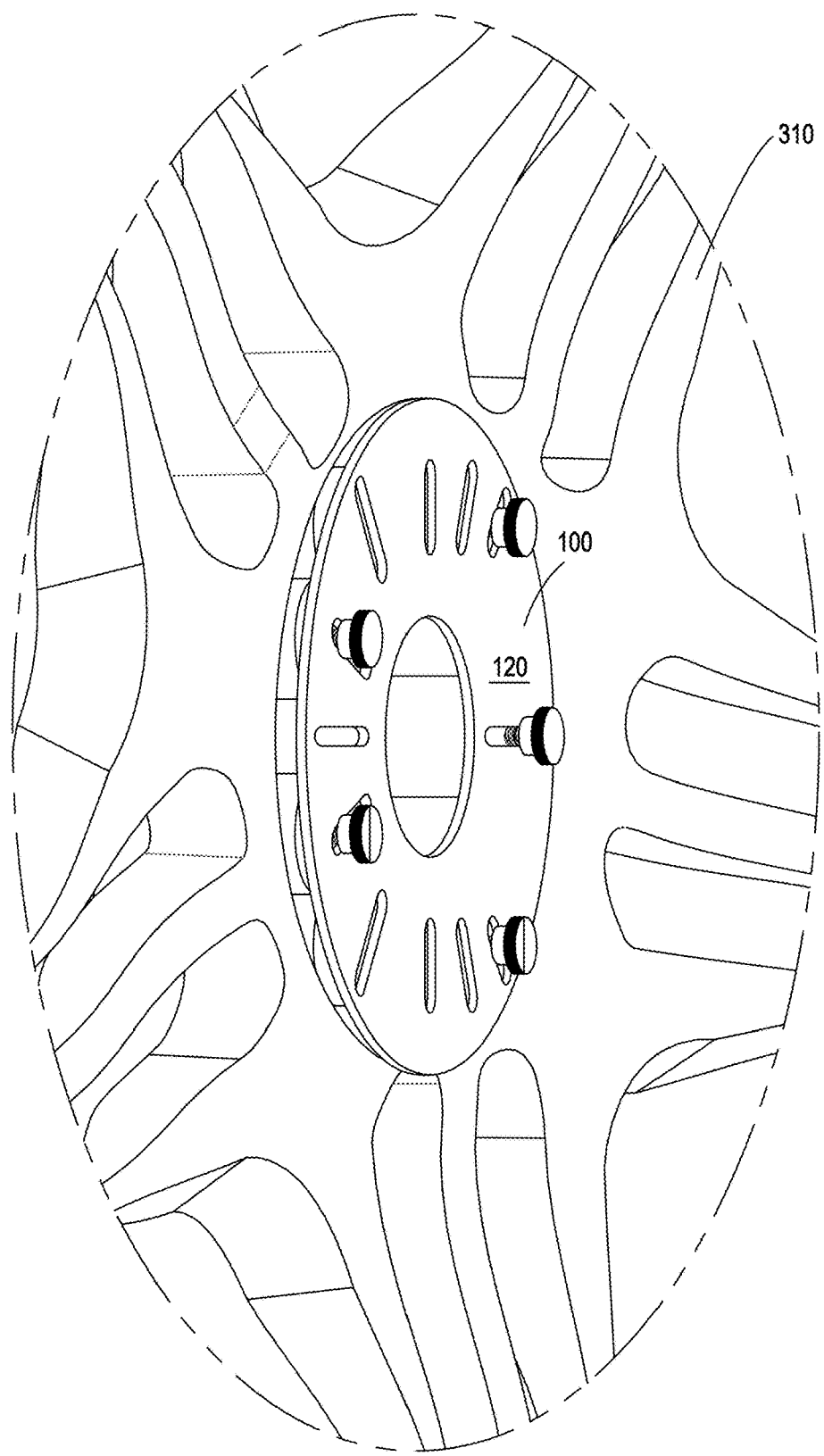
Figure 4A:
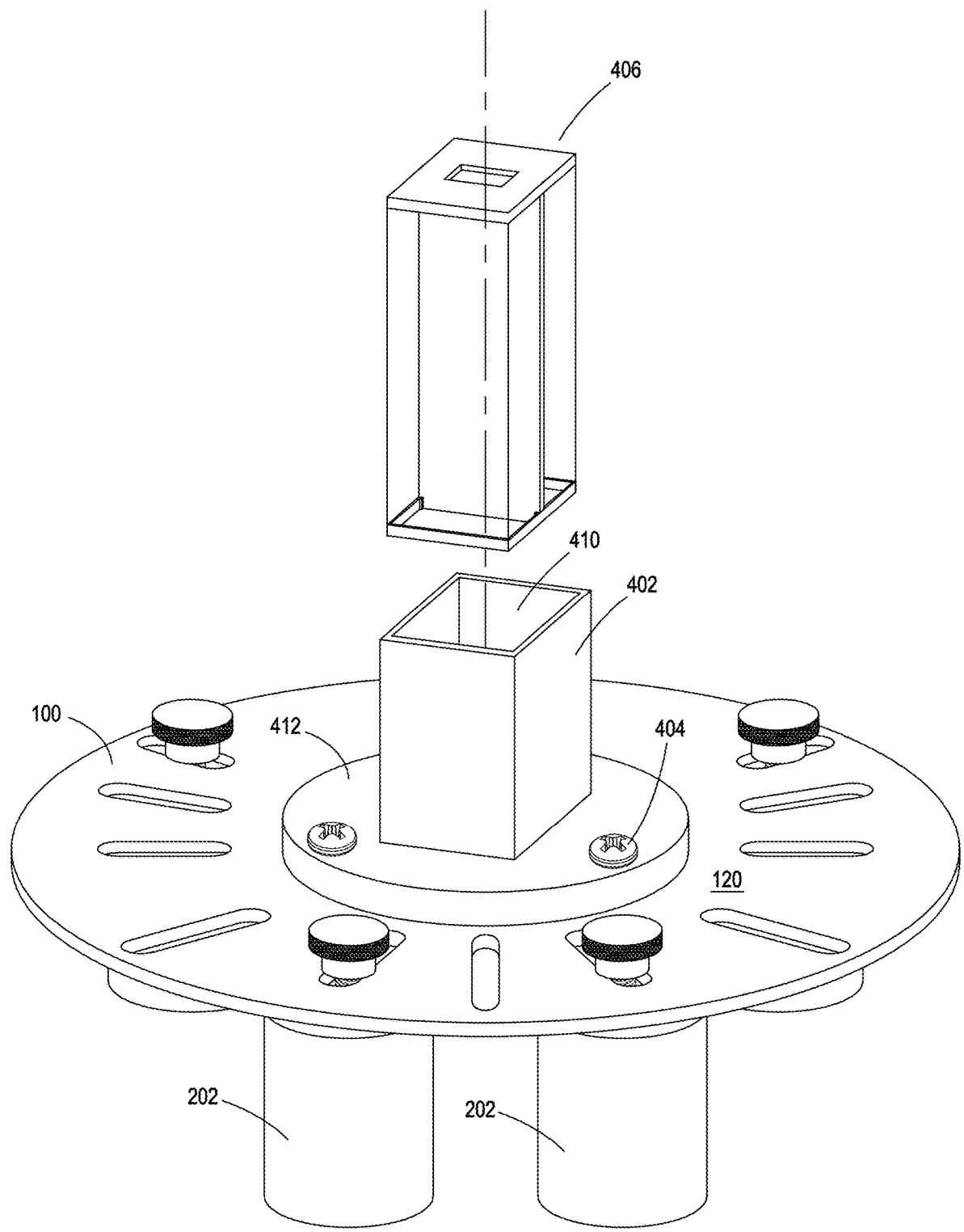
FIGS. 4A and 4B show a single, center-mounted IMU of the assembly.
Figure 4B:
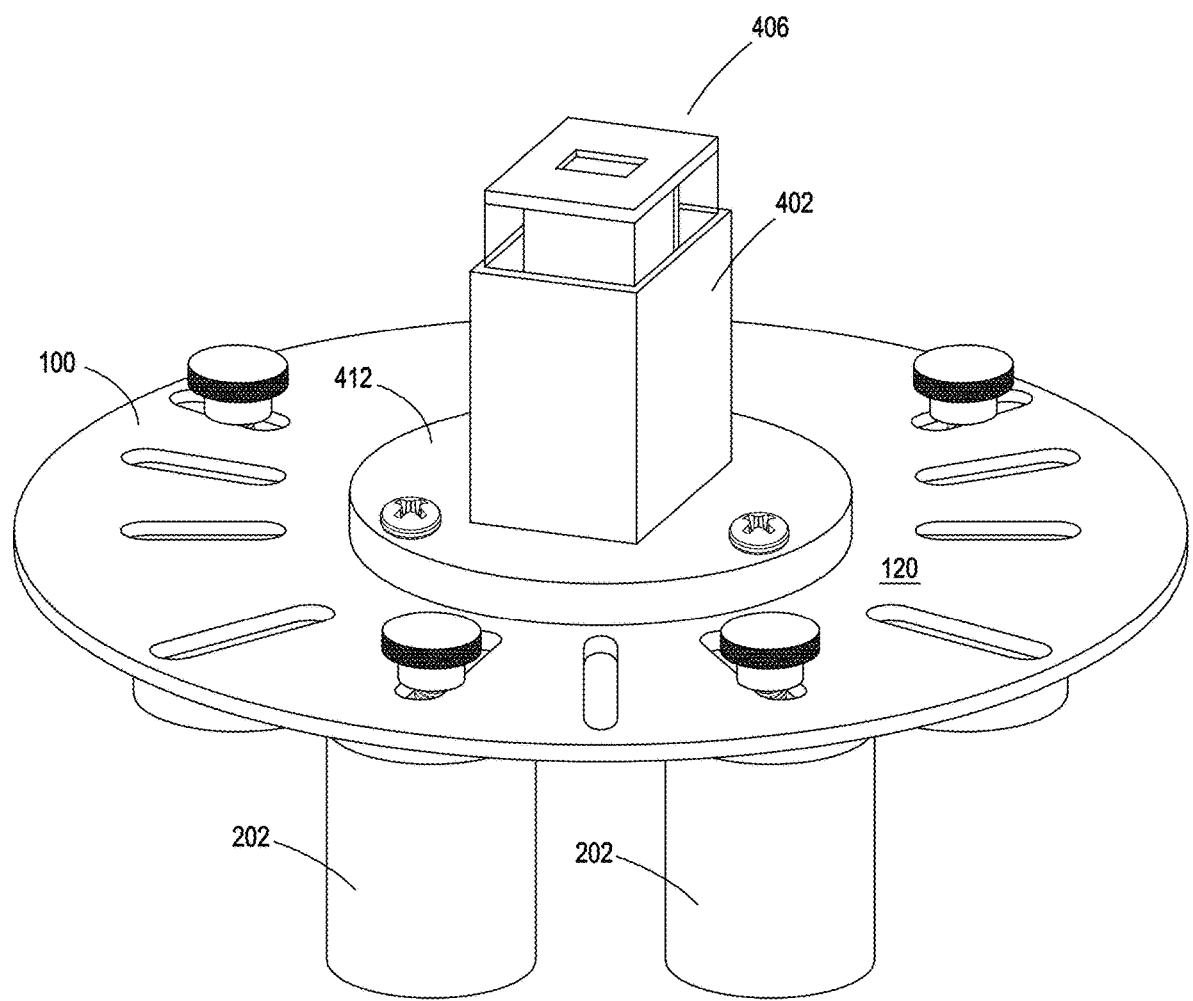

A general overview of one preferred embodiment is described with respect to FIGS. 3A, 3B, 3C, 4A and 4B. FIG. 4B shows a fully assembled apparatus configured to be removably attached to a tire/hub assembly of a vehicle via lug nuts of the tire/hub assembly for use in determining imbalance forces of the tire/hub assembly during motion of the vehicle. The tire/hub assembly and its corresponding lug nuts 304 are best shown in FIG. 3B. In FIGS. 3B and 3C, element 310 represents a center cutaway of a vehicle rim which is part of the tire/hub assembly. FIG. 3A shows two conventional hub assemblies that may form part of the tire/hub assembly. The upper diagram of FIG. 3A shows a hub with studs, collectively, labeled as 300. A lug nut 304 is attached to a distal end of each stud. The lower diagram of FIG. 3A shows a hub with threaded holes, collectively, labeled as 302. A lug bolt 306 is attached to each threaded hole. Not shown in FIGS. 3A and 3B is the tire which is located between the hub 300 and the lug nuts 304 in the upper diagram of FIG. 3A, and between the hub 302 and the ends of the lug bolts 306 in the lower diagram of FIG. 3B. As described herein, the lug nuts 304 perform the same function as the lugs at the end of the lug bolts 306, and thus they can be considered as equivalent elements.

Referring again to FIGS. 3B, 3C, 4A and 4B, one preferred embodiment of the apparatus in the present invention includes an assembly of the following elements:
 i. a disk 100 (generally cylindrical plate),
 ii. a plurality of cup-shaped objects 202 (also, interchangeably referred to herein as "cups 202," and
 iii. one or more IMU's 406 (an IMU may also be referred to as an "IMU sensor").

Figure 2A:
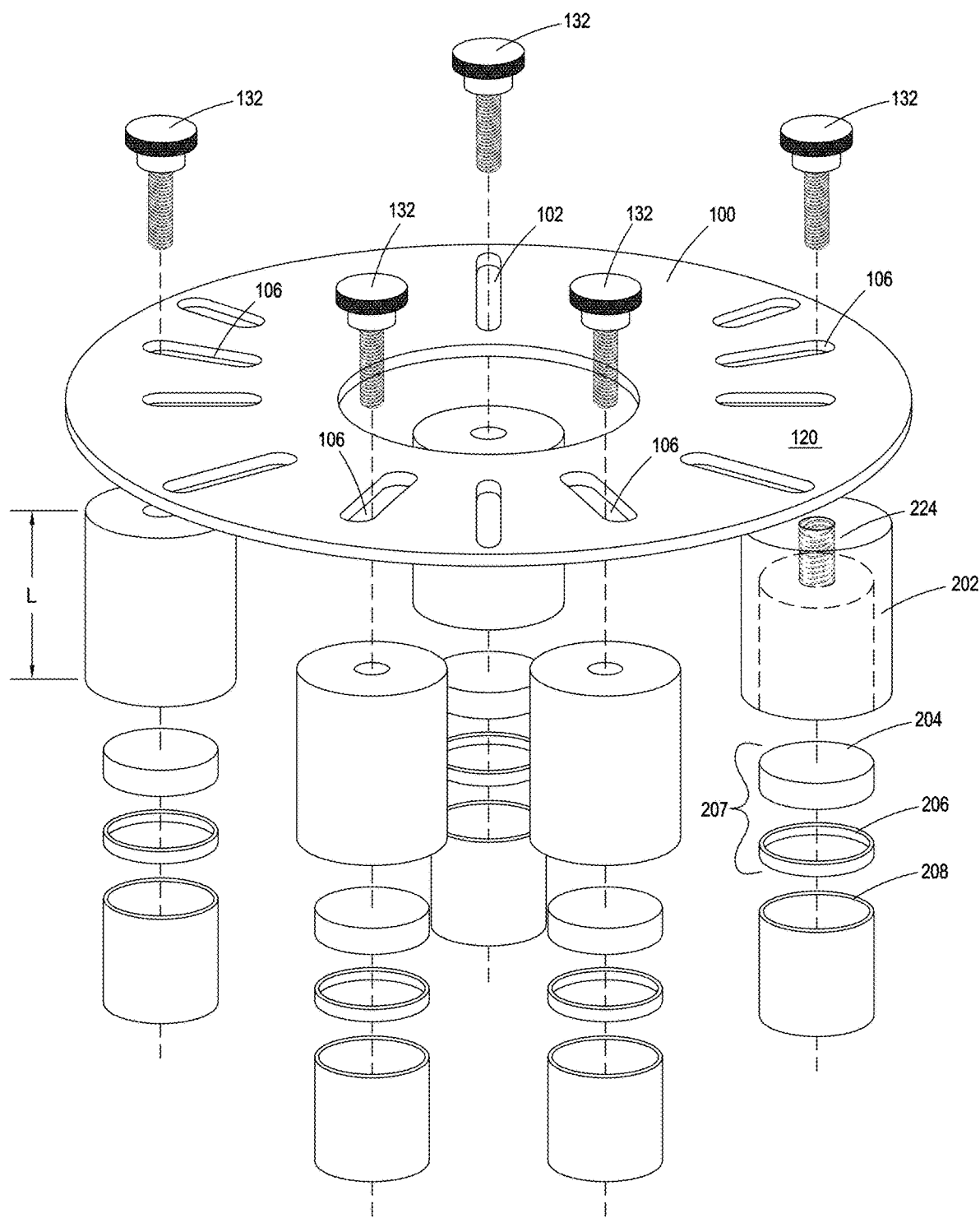
FIGS. 2A-2C show details of cup-shaped objects for use with the apparatus, and also show details of how the cup-shaped objects are attached to the disk.
Figure 2B:
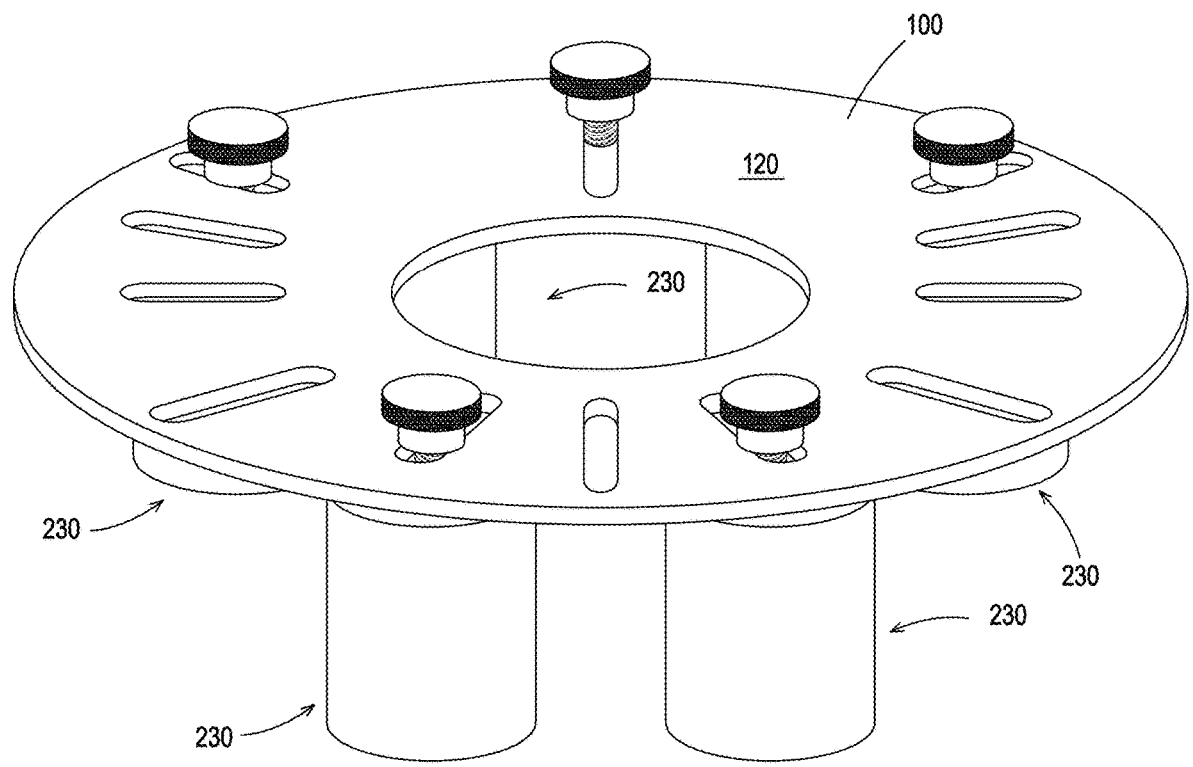
Figure 2C:
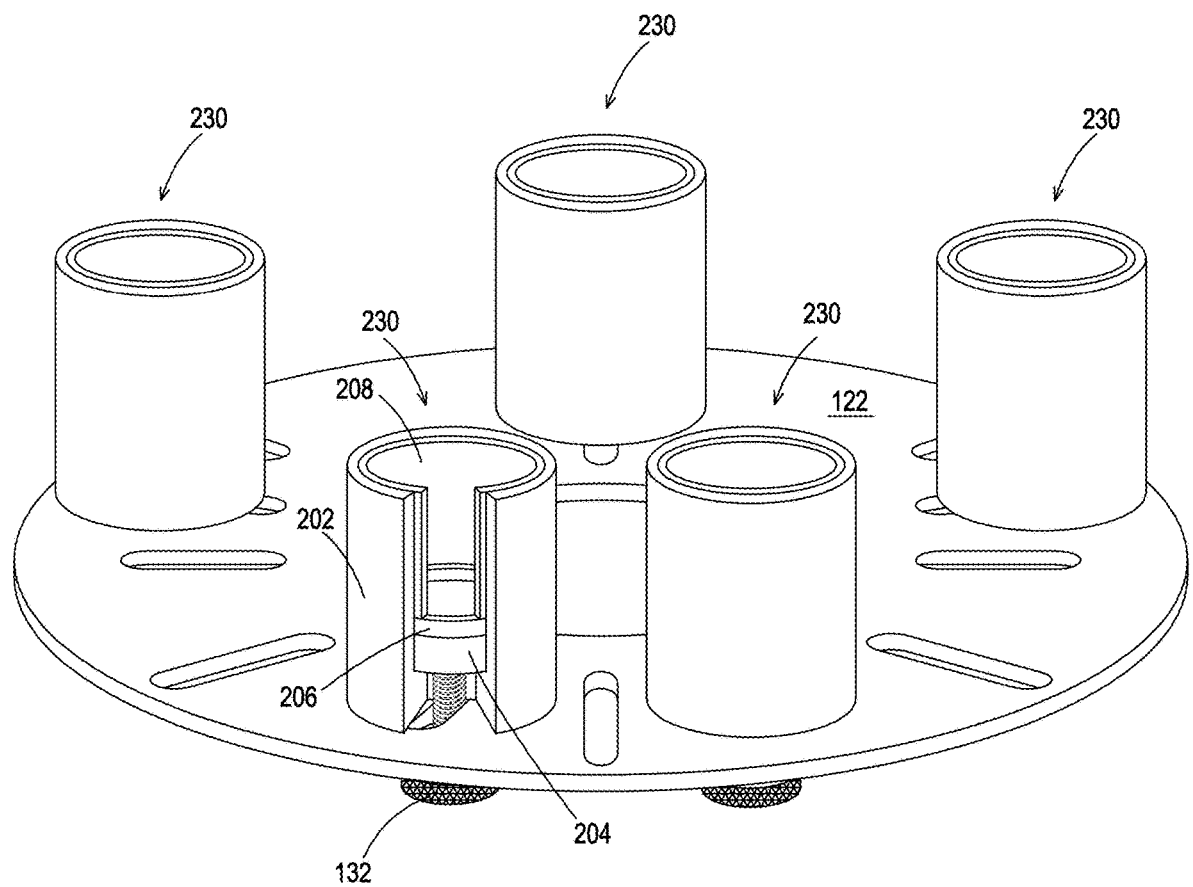

The disk 100 has an outer facing surface 120 and an inner facing surface 122 (labeled in FIG. 2C). The inner facing surface 122 faces the hub 300 when the apparatus is mounted to the vehicle's tire/hub assembly.

FIGS. 3B and 3C show a partially assembled apparatus that includes the disk 100 and the cup-shaped objects 202, whereas FIGS. 4A and 4B show all of the above-listed elements i.-iii. In each of these figures, the disk 100 and the cup-shaped objects 202 are part of an overall assembly 230 of thumbscrew 132, cup 202, magnet 204, magnet capture ring 206, and the appropriately sized adapter 210, 212, or 214, all of which are described in more detail below.

Each cup-shaped object 202 is rigidly fixed at one end to the disk 100 and extends perpendicularly outward from the disk 100. The plurality of cup-shaped objects 202 are arranged a fixed radial distance from the radial center of the disk 100 in a pattern that matches the lug nuts 304 of the tire/hub assembly. Each cup-shaped object 202 is hollow along at least a portion of its length that is distal from the disk 100. The hollow portion has a diameter that is slightly larger than a diameter of the lug nuts 304 of the tire/hub assembly so as to allow the apparatus to be mounted to the vehicle's tire/hub assembly by fitting the plurality of cup-shaped objects 202 over the lug nuts 304 of the tire/hub assembly, as best illustrated in FIGS. 3B and 3C. The one or more IMU's 406 are mounted to the disk 100, as best illustrated in FIGS. 4A and 4B, and are configured to measure parameters that are used for calculating the imbalance forces during motion of the vehicle. In the embodiment of FIGS. 4A and 4B, a single IMU 406 is mounted in a center of the disk 100. Other embodiments that use multiple IMU's are described below with respect to FIGS. 5A and 5B.

The one or more IMU's 406 may be mounted to the disk 100 in any suitable manner. In the embodiment of FIGS. 4A and 4B, the single IMU 406 is mounted to the outer facing surface 120 of the disk 100 via IMU housing 402. The IMU housing 402 has a rectangular-shaped slot 410 and mounting plate 412 formed as one piece. The mounting plate 412 is attached via screws 404 to a center portion of the outer facing surface 120 of disk 100. The slot 410 receives the IMU 406, as illustrated in FIG. 4A which shows the IMU 406 exploded from the slot 410, and FIG. 4B which shows the IMU 406 fully inserted into the slot 410. The IMU 406 is securely retained in the slot 410 by any suitable means, such as friction fit, clamps, holding screws, or hook and loop fastener material.

Figure 5A:
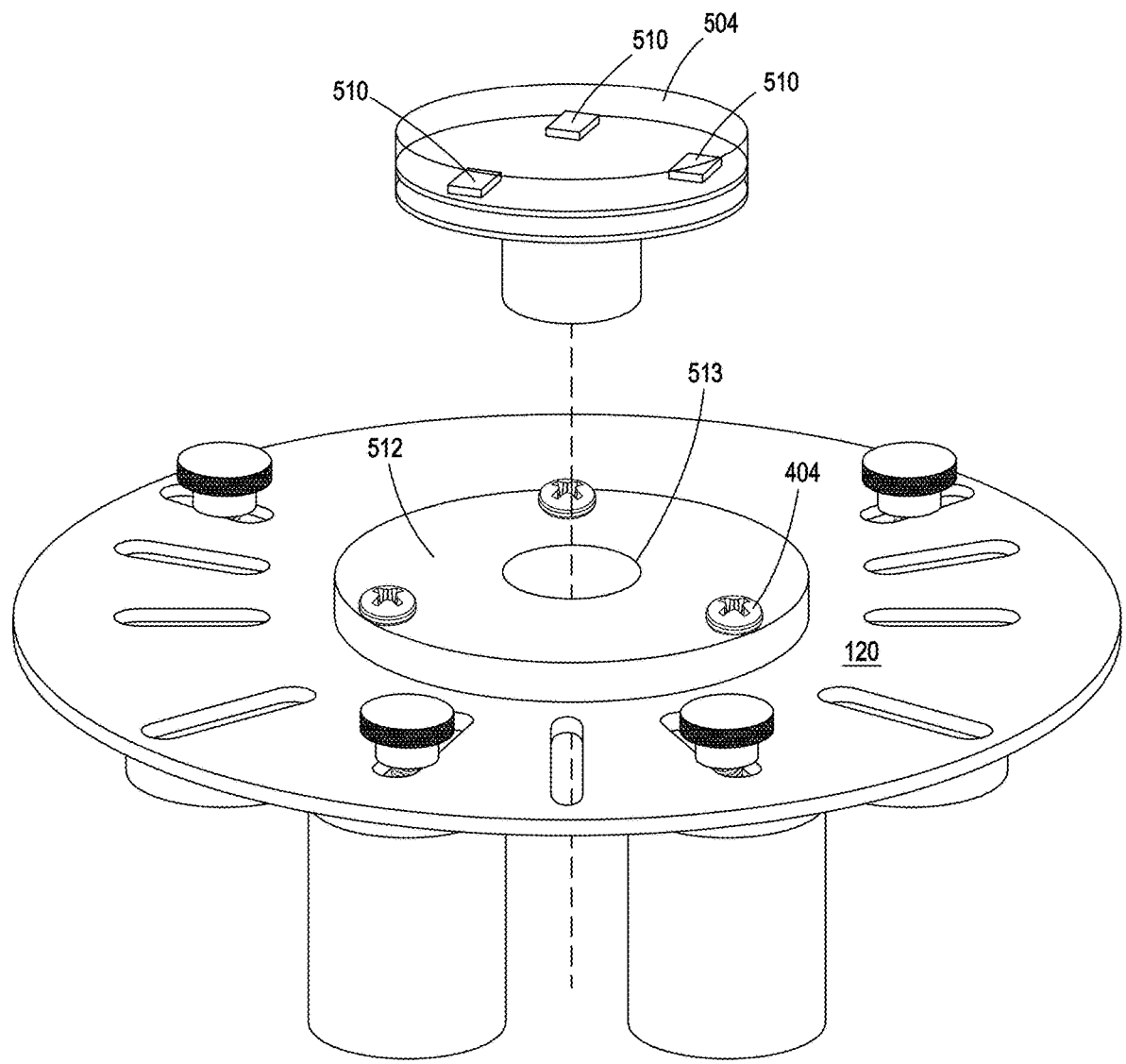
FIGS. 5A and 5B show an alternative embodiment of the assembly having multiple IMU's.
Figure 5B:
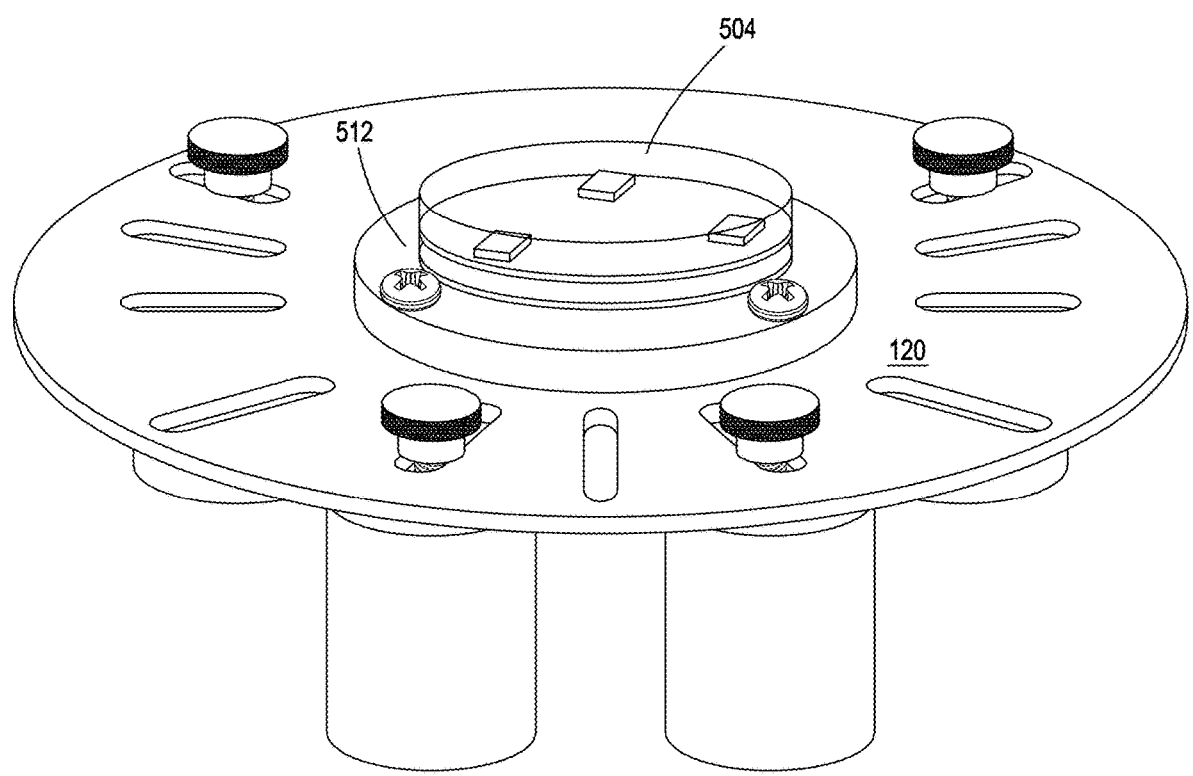

FIGS. 5A and 5B show another embodiment of the apparatus wherein there are three IMU's 510 arranged in an equilateral triangle configuration, wherein each IMU is equidistant from the center of the disk 100. In this manner, each IMU is placed at 120 degree angles from the center of the disk 100. FIG. 5A shows one mounting embodiment wherein the three IMU's 510 are fixed to mounting flange 504, which is then attached to mounting plate 512 via a center hole 513 in the mounting plate 512. FIG. 5B shows the fully assembled view.

Lug nut configurations differ among vehicles in at least the following ways:
 i. number of lug nuts
 ii. diameter of the lug nuts
 iii. radial distance of the lug nuts from the center of the hub
 iv. lug patterns, namely, the arrangement of lug nuts along the fixed radius from the center of the hub (typically equidistant, but not always)

These parameters result in a large number of permutations of potential lug nut configurations. However, there are a handful of well-known configurations that cover a large percentage of vehicles. The assembly has various features to allow for its use with many different common configurations, as described below.

Figure 1A:
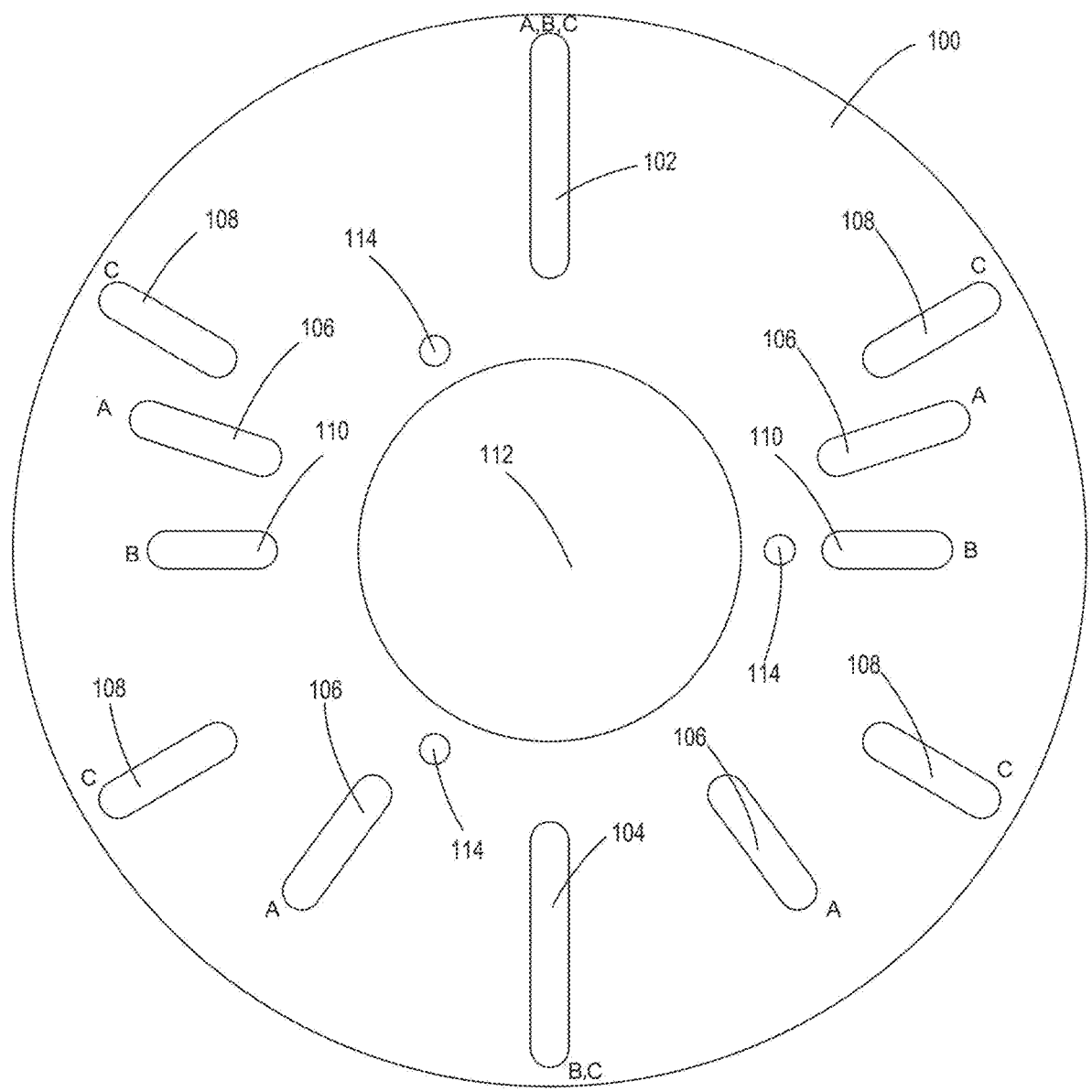
FIGS. 1A-1D show a disk for use with the apparatus of the present invention.

FIG. 1A shows the disk 100 by itself. The disk 100 includes a center opening 112 and device mounting holes 114 for receiving the screws 404 shown in FIGS. 4A, 4B, 5A, and 5B.

The disk also includes the following slots:
 i. slot 102 for use with a 4, 5, or 6 lug patterns
 ii. slot 104 for use with 4 and 6 lug patterns
 iii. slot 106 for use with 5 lug patterns
 iv. slot 108 for use with 6 lug patterns
 v. slot 110 for use with 4 lug patterns The various lug patterns are also represented by letters A, B, and C.

To allow for interchangeability, the cup-shaped objects 202 are removably attachable to the disk 100 to allow a set of cup-shaped objects 202 to be reconfigured on the disk 100 to match the appropriate lug nut configuration for a particular vehicle. Likewise, different sets of cup-shaped objects 202 can be provided having different diameters to accommodate different diameter lug nuts 304. The slots 102-100 allow for changing the radial distance of the lug nuts from the center of the hub, as opposed to providing holes that would only accommodate one radial distance.

Figure 1B:
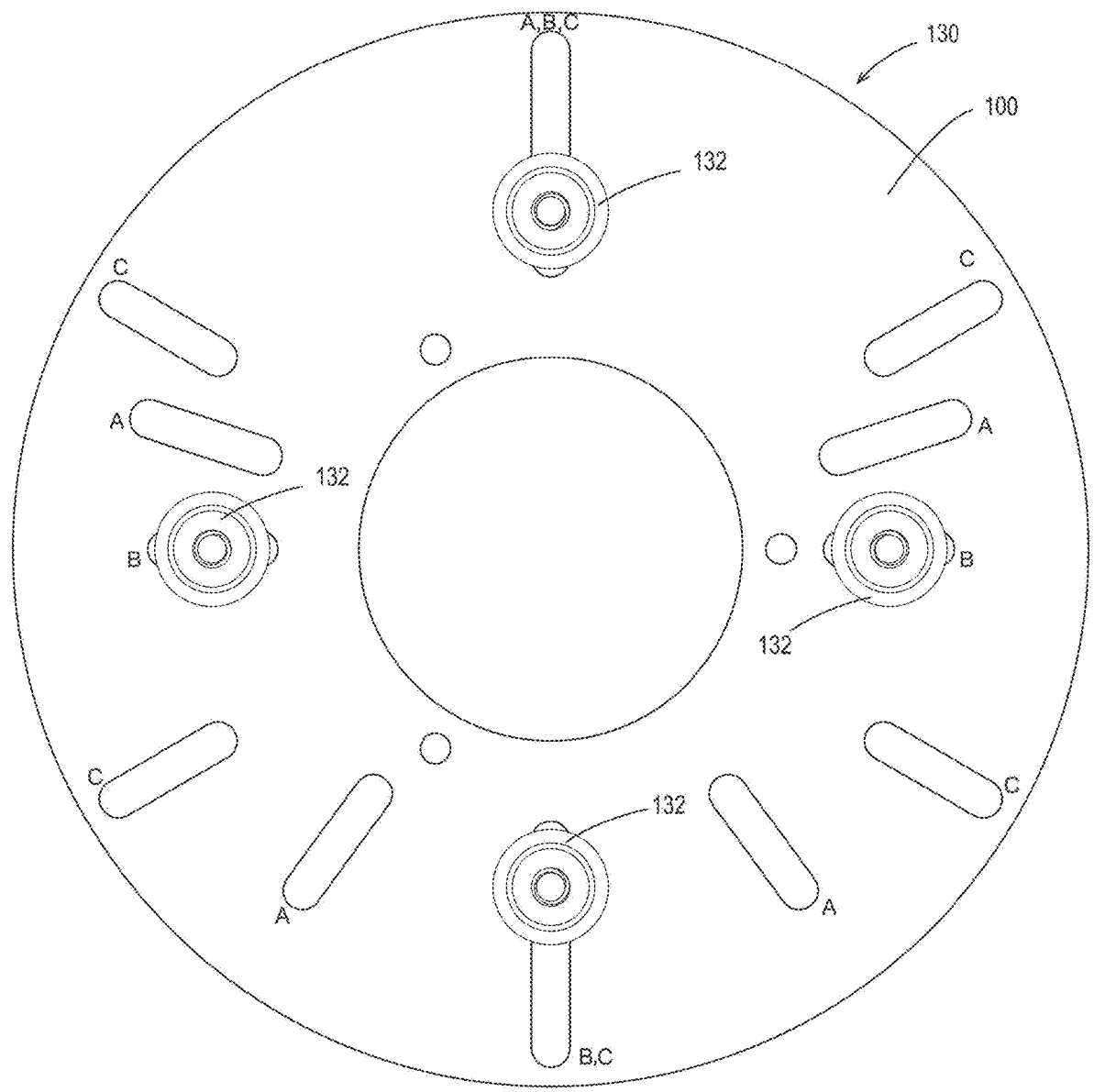
Figure 1C:
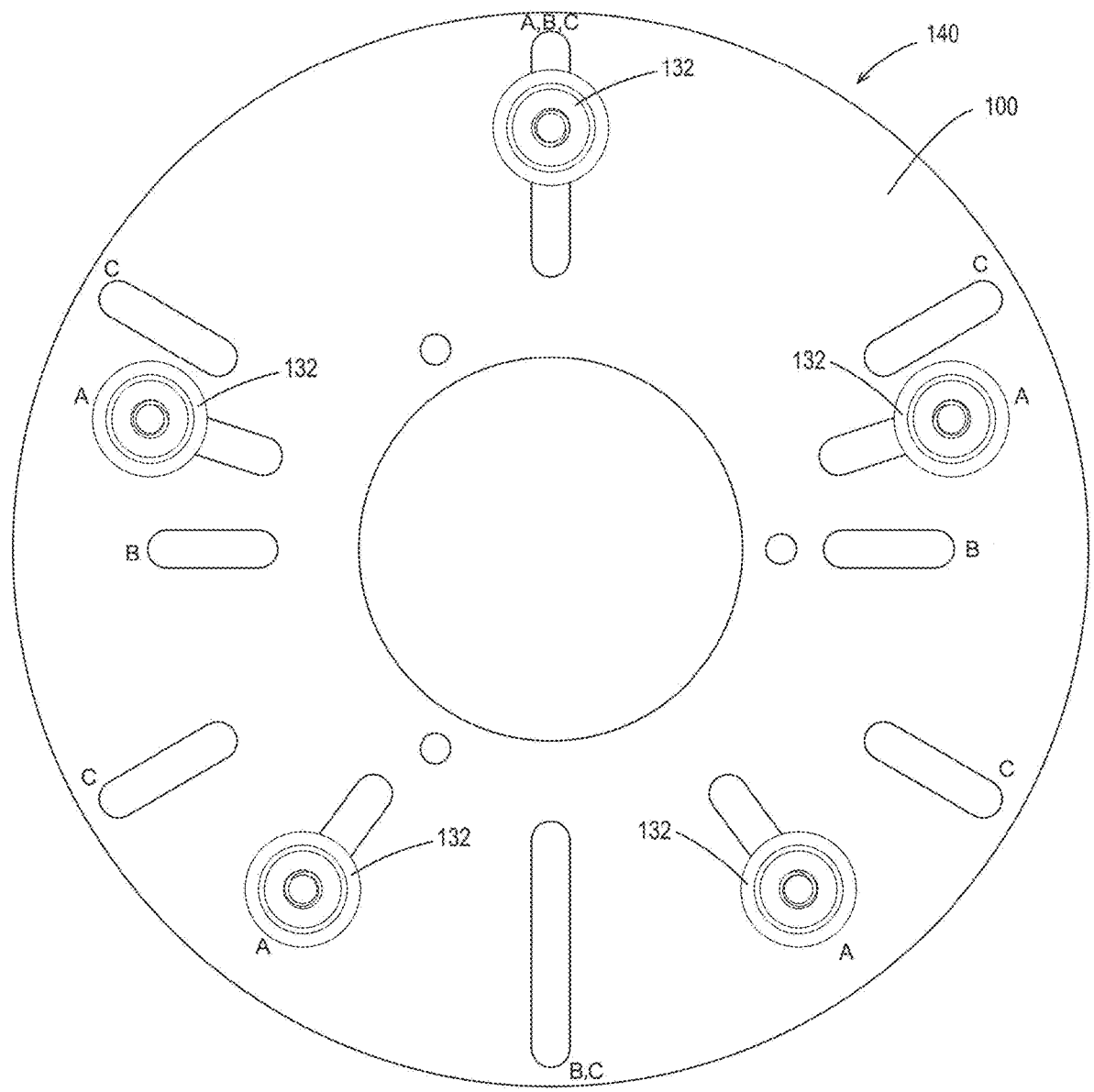
Figure 1D:
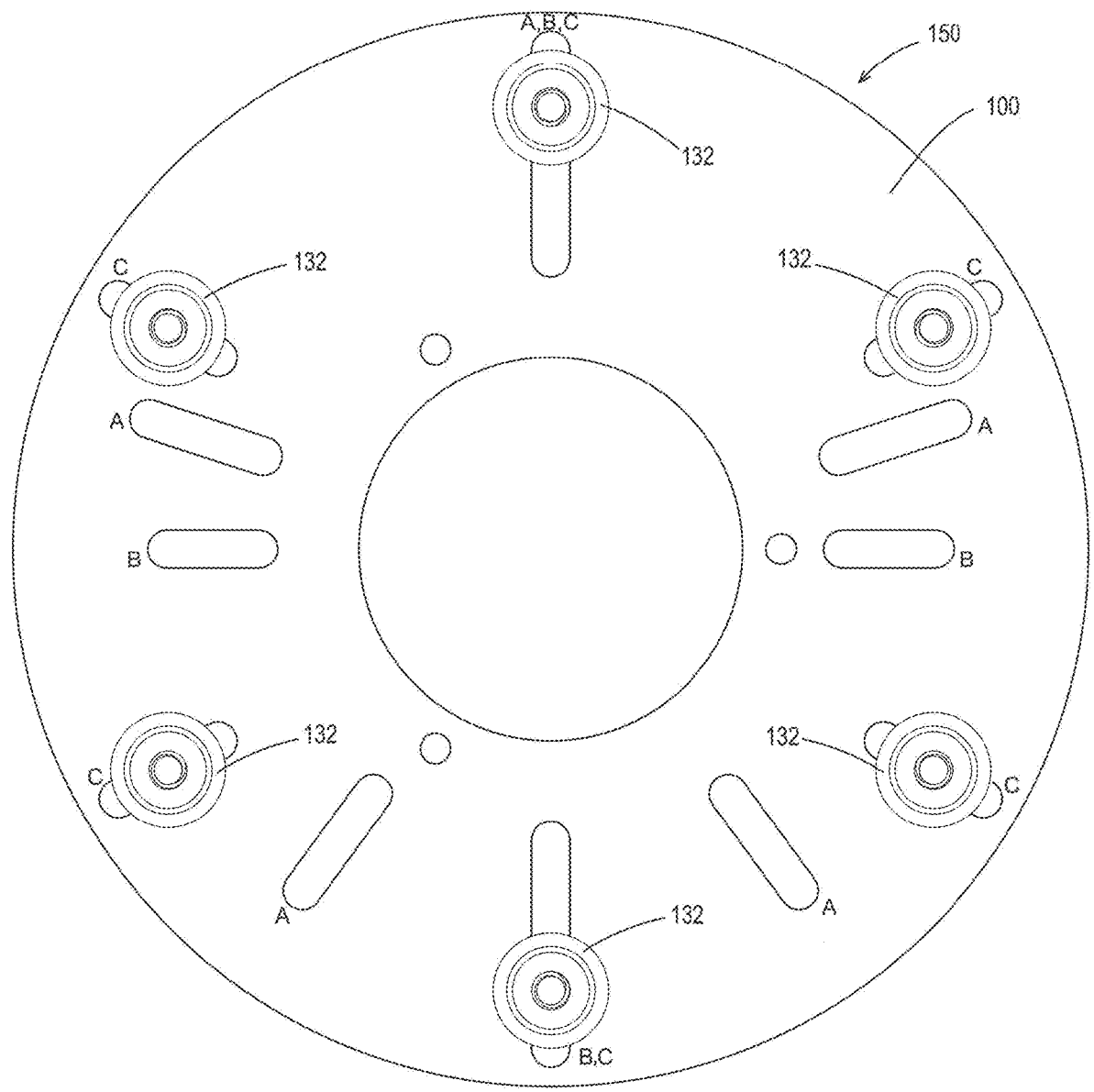

FIGS. 1B-1D show thumbscrews 132 which are used to fasten the cup-shaped objects 202 to the disk 100, as described below. FIG. 1B shows a 4 lug pattern that requires four thumbscrews 132 (one for each cup-shaped object 202), FIG. 1C shows a 5 lug pattern that requires five thumbscrews 132 (one for each cup-shaped object 202), and FIG. 1D shows a 6 lug pattern that requires six thumbscrews 132 (one for each cup-shaped object 202).

Figure 2D:
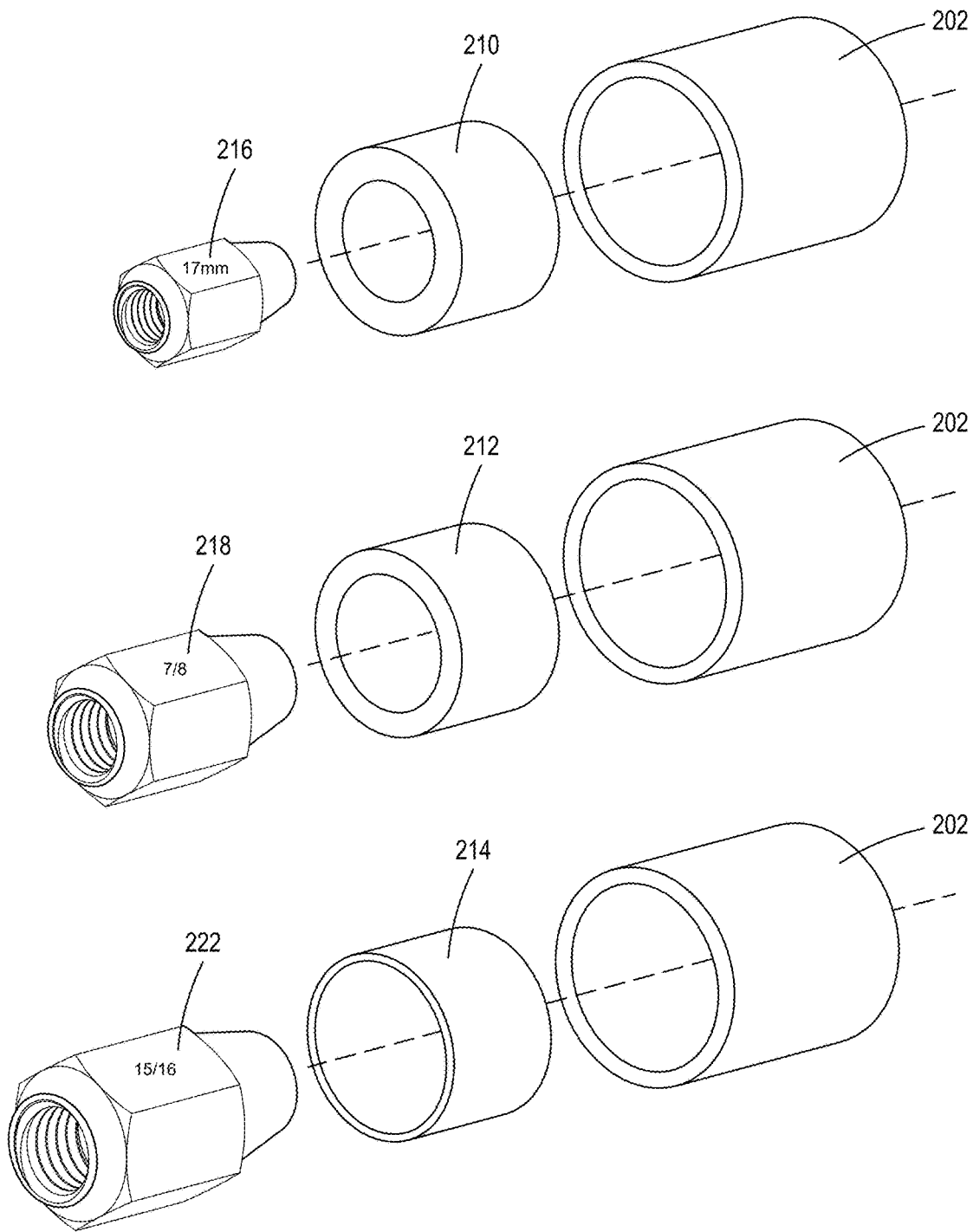
FIG. 2D show details of how the cup-shaped object is fit over a lug nut.

FIGS. 2A-2D show additional details of the cup-shaped objects 202, and they also show details of how the cup-shaped objects 202 are attached to the disk 100. The example in FIGS. 2A-2D uses the 5 lug pattern of FIG. 1B. FIG. 2A is an exploded top view of the apparatus, FIG. 2B is a fully assembled top view of the apparatus, FIG. 2C is fully assembled bottom view of the apparatus, and FIG. 2D is an exploded view of different lug nut adapters (described below) for use with the cup-shaped object 202.

FIG. 2A shows five thumbscrews 132 which are used to fasten five cup-shaped objects 202 to the disk 100. Each thumbscrew 132 is inserted through an appropriate slot 102 or 106 associated with the 5 lug pattern of FIG. 1B, and is screwed into threaded holes 224 shown in phantom in a center of a distal portion of each cup-shaped object 202. When fully screwed in, a flange of each thumbscrew 132 is flush against the outer facing surface of the disk 100, and each thumbscrew 132 securely holds its respective cup-shaped object against the inner facing surface 122 of the disk 100, as shown in FIG. 2C.

FIG. 2A also shows magnet 204, magnet capture ring 206, and lug nut adapter 208 that are received inside each of the respective cup-shaped objects 202. The magnet 204 and magnet capture ring 206 form a magnet assembly 207 that is placed in a pocket area of the cup-shaped object 202 so as to be flush against a distal end surface of the cup-shaped object 202 (top portion of the cup-shaped object 202 when viewed in FIG. 2A, bottom portion of the cup-shaped object 202 when viewed in FIG. 2B). The magnet 204 is thus fixedly mounted at an end of the cup-shaped object 202 that is proximate to the disk 100. The magnet assembly 207 is held in place within the cup-shaped object 202 by friction fit. Adhesive may alternatively be used for this purpose. In use, the magnets 204 magnetically engage with the lug nuts 304 when the apparatus is attached to the tire/hub assembly of a vehicle, and thereby inhibit the apparatus from coming off of the vehicle when the vehicle is in motion. In one preferred embodiment, there is a magnet 204 in each cup-shaped object 202. However, depending upon the strength of the magnets 204, it may not be necessary to provide magnets 204 in each cup-shaped object.

FIG. 2A also shows a lug nut adapter mounted inside each cup-shaped object 202. As discussed above, lug nuts come in a variety of different head diameters. To avoid excessive play when the apparatus is attached to the tire/hub assembly of a vehicle, an appropriately sized hollow lug nut adapter 208 is selected for the lug nuts of the vehicle so as to provide a snug fit, but not necessarily a friction fit. This also helps to ensure that IMU 406 or IMU's 510 are symmetrically arranged with respect to a center axis of the tire/hub assembly. The lug nut adapter 208 may be removable to allow for different sized adapters to be used with the same cup-shaped object 202 and may be held in place within the cup-shaped object 202 by friction fit. Alternatively, the lug nut adapter 208 may be permanently assembled within the cup-shaped object 202. If so, different cup-shaped objects 202 will be required for lug nuts of different head diameters.

The cup-shaped objects (cups) 202 have a depth of length, labeled as "L" in the leftmost cup 202 of FIG. 2A that is sufficient to accommodate a thread portion for receiving the thumbscrew 132, the magnet assembly 207, and the full depth of the lug nut 304.

FIG. 2B is a fully assembled top view of the apparatus of FIG. 2A, and FIG. 2C is a fully assembled bottom view of the apparatus of FIG. 2A. In FIGS. 2B and 2C, element 230 refers to the assembly of the thumbscrew 132, cup 202, magnet 204, magnet capture ring 206, and the appropriately sized adapter 210, 212, or 214.

FIG. 2D shows examples of three different lug nut adapters 210, 212 and 214 for use with the same cup-shaped object 202. The uppermost diagram shows lug nut adapter 210 for accommodating a 17 mm lug nut 216, the middle diagram shows a lug nut adapter 212 for accommodating a 7/8 inch lug nut 218, and the bottommost diagram shows a lug nut adapter 214 for accommodating a 15/16 inch lug nut 222. The lug nut adapters 210, 212 and 214 provide the same functionality as the lug nut adapter 208 described above and shown in FIG. 2A.

Figure 2E:
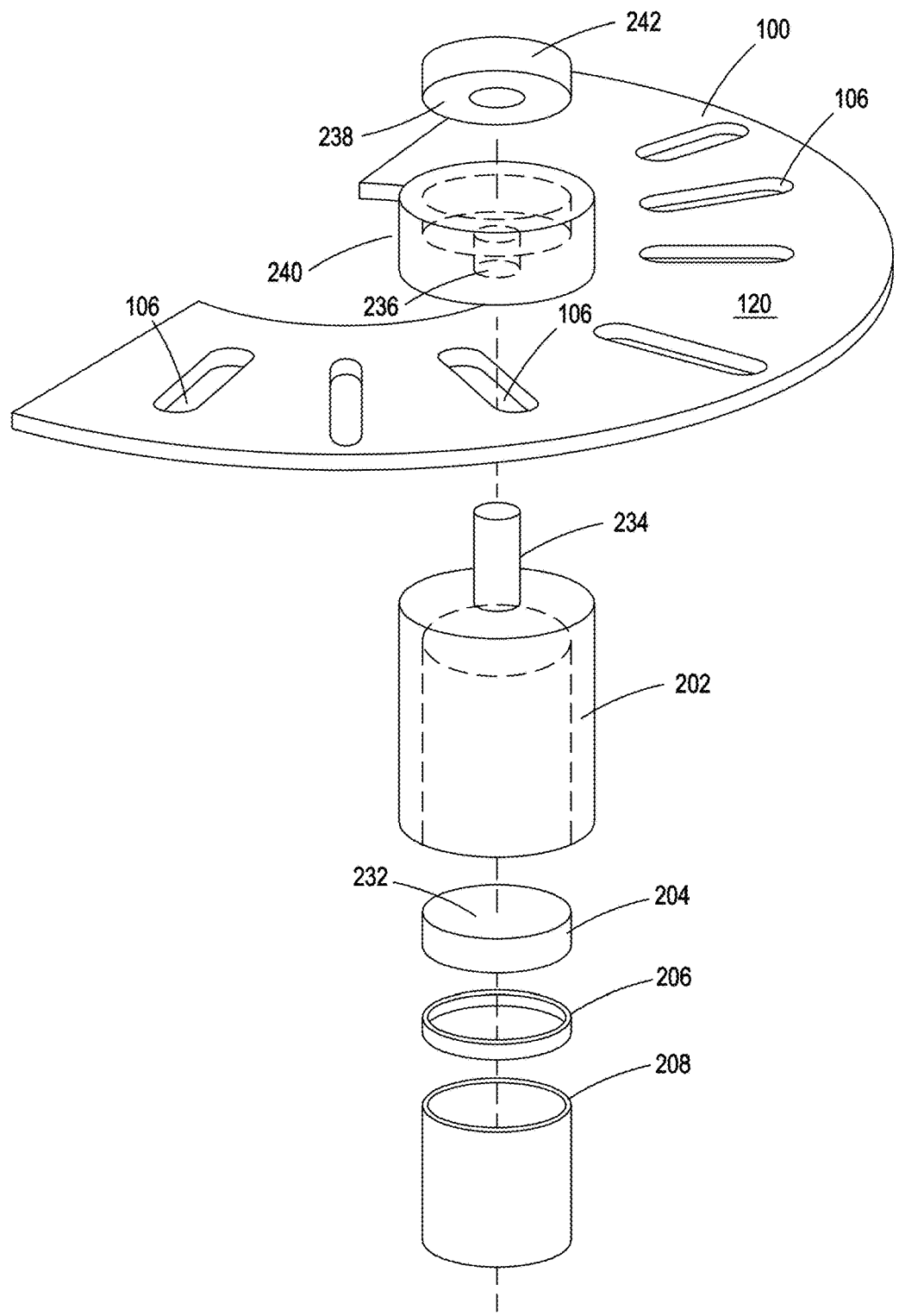
FIG. 2E shows a partial view of an alternative assembly for rapidly attaching the disk to a tire/hub assembly.

FIG. 2E shows a partial view of an alternative assembly for rapidly attaching disk 100 to a tire/hub assembly when time-is-of-the-essence, particularly when interchangeability is due to different vehicles and varying hub/lug configurations are sequentially encountered and the threading and/or unthreading of thumbscrews, nuts, and cups, is impractical and labor intensive. Cup 202 still contains magnet 204, magnet capture ring 206, and may or may not require lug nut adapter 208 for attachment to vehicle lug nuts. Instead of a threaded type of attachment as shown in FIG. 2A, FIG. 2E shows cup 202 having an affixed cylindrical shaft 234 that passes through slot 106 of disk 100. Magnetically locking cylinder 240 is pressed onto cylindrical shaft 234 through hole 236 and is firmly held in place because the disk facing surface 238 of the ring magnet 242 is the opposite polarity of the disk facing surface 232 of magnet 204, thereby producing a strong magnetic clamp. All contact surfaces of cup 202, disk 100, and magnetic locking cylinder 240 may have abrasive or geometrically opposite mating surfaces to decrease lateral slippage when magnetically clamped.

The materials for constructing certain parts of the apparatus such as the disk 100, cup-shaped objects 202, and IMU housing 402 are preferably rigid and durable so as to withstand movement on a vehicle with minimal play. One suitable material is a thermoplastic polymer, such as acrylonitrile butadiene styrene (ABS). The selected material must also not cause interference with the electronics of the IMU's. ABS has electrical insulation properties that are well-suited to the operating environment of the apparatus.

Figure 7A:
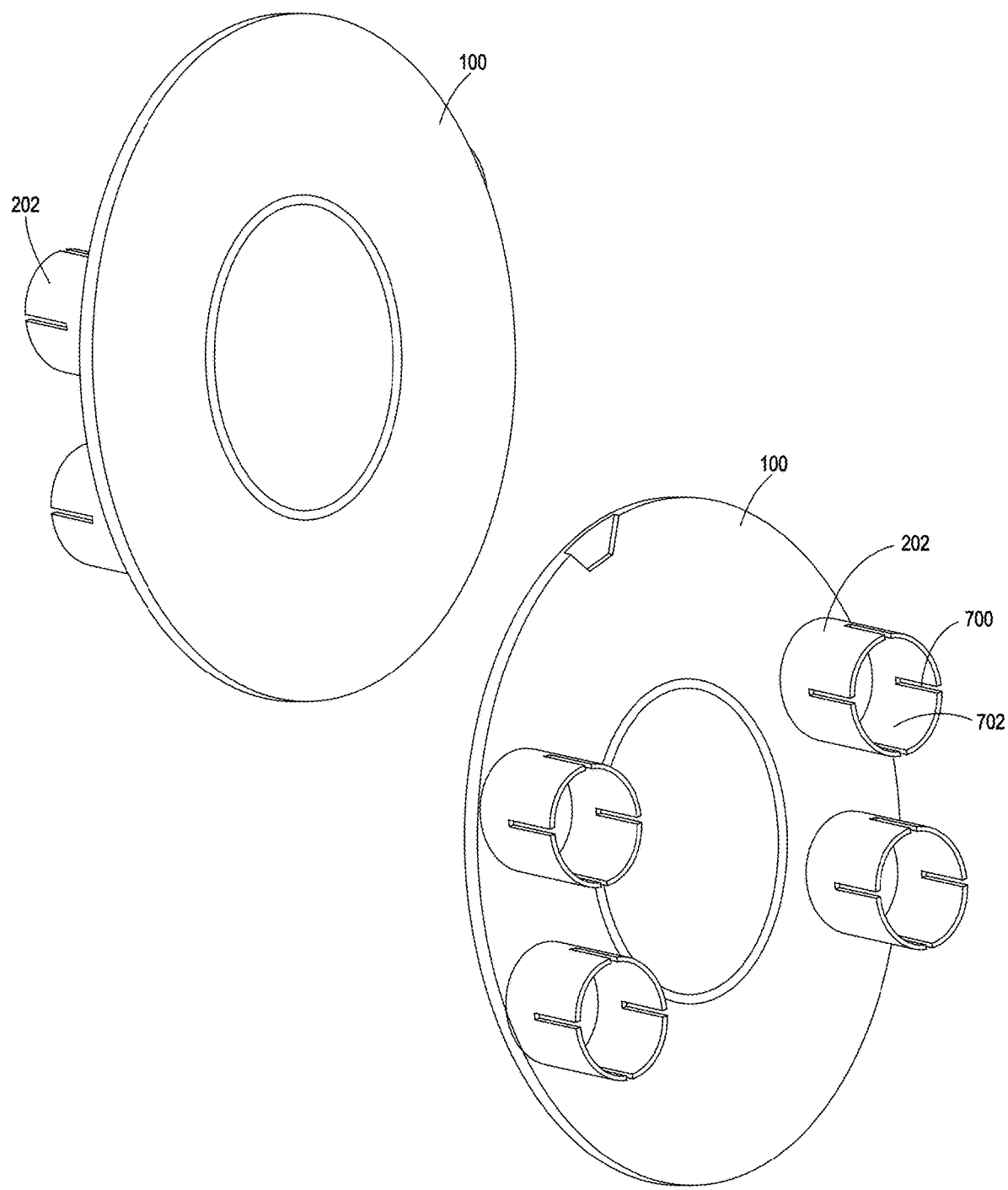
FIGS. 7A-7C show an alternative embodiment of the apparatus having cup-shaped objects that are friction-fit to the lug nuts.
Figure 7B:
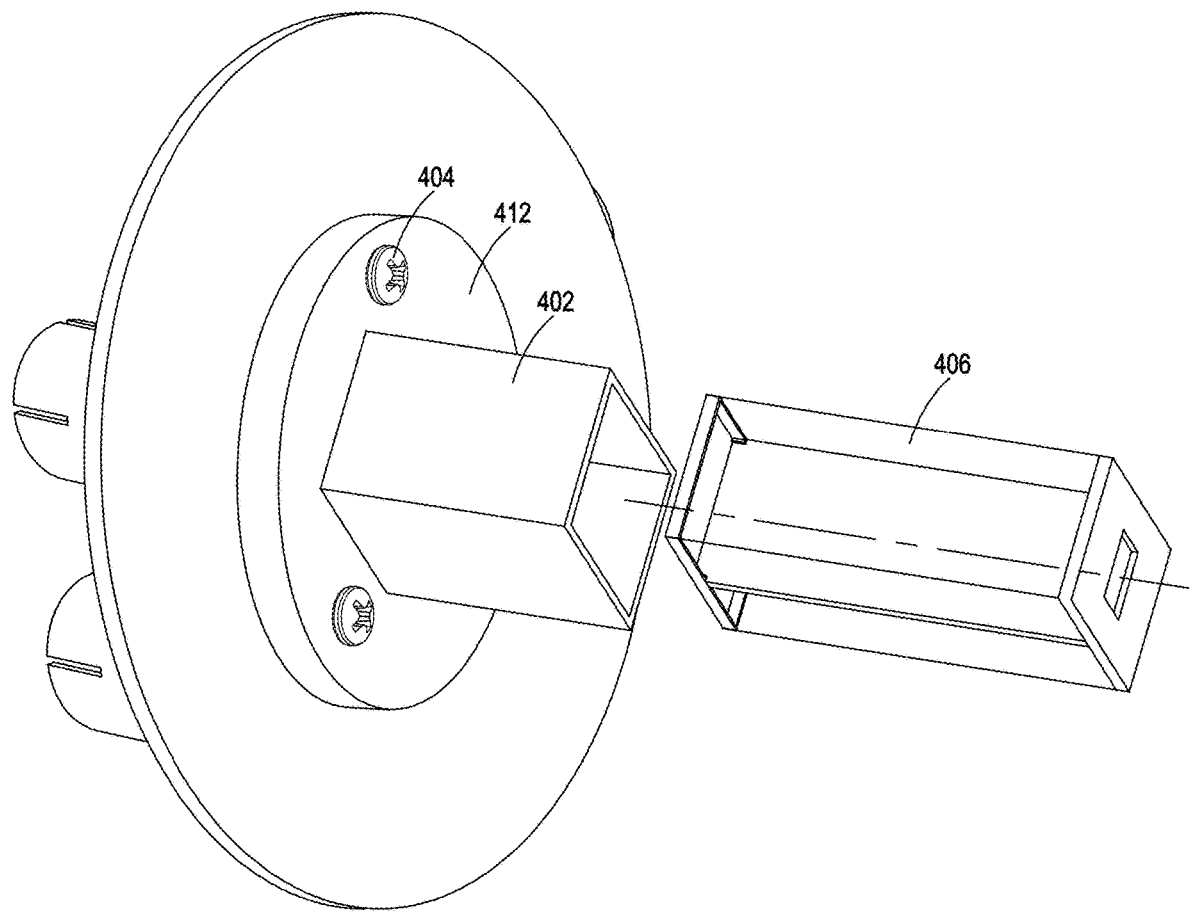
Figure 7C:
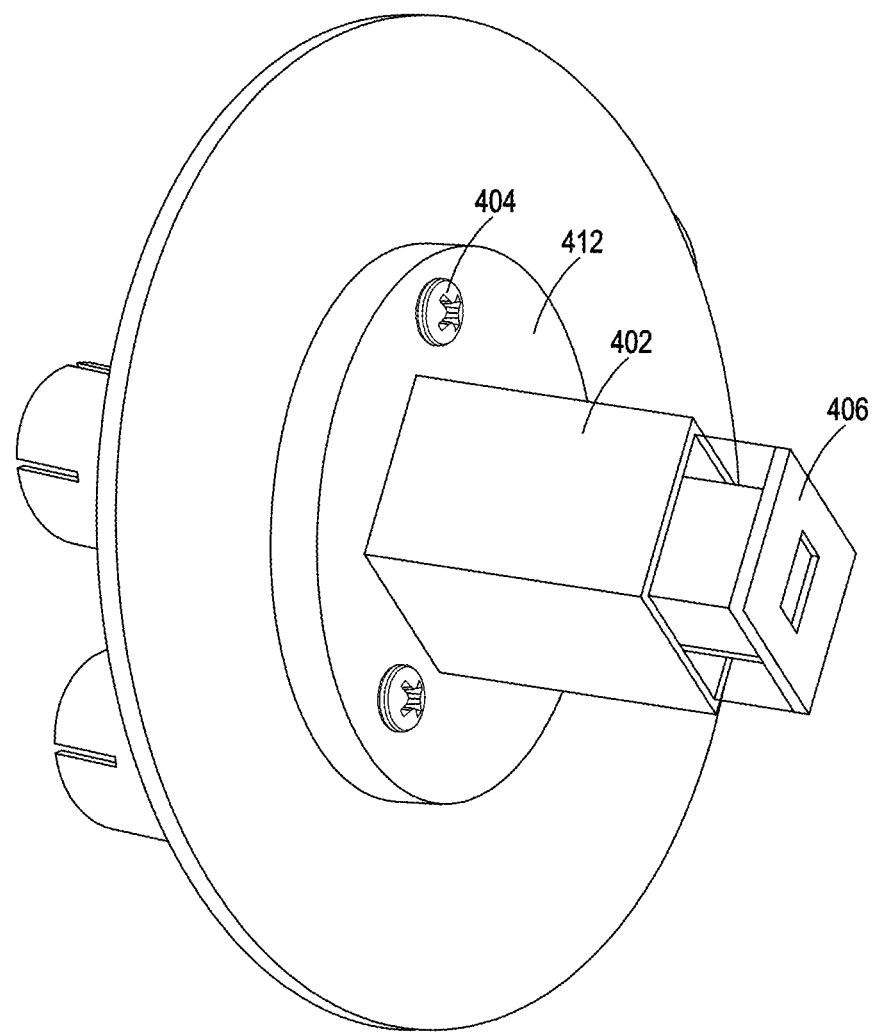

FIGS. 7A-7C show another embodiment of the apparatus of the present invention that includes an assembly of the following elements:

i. disk 100 (generally cylindrical plate),
  ii. a plurality of cup-shaped objects 202, and
  iii. one or more IMU's 406 (an IMU may also be referred to as an "IMU sensor").

The embodiment of FIGS. 7A-7C differs from the embodiment described above in that the disk 100 and the cup-shaped objects 202 are preferably formed as a single unit, such as by injection molding. Since the cup-shaped objects 202 are not removable, the single unit will be limited in use to a particular lug nut pattern. However, fabrication costs may be lower due to the reduced number of parts, the elimination of any need for creating slots in the disk 100, and the relative inexpensiveness of injection molding. The remaining parts of the apparatus of FIGS. 7A-7C are the same as the embodiment described below, namely, the IMU housing 402 that is mounted to the single unit via screws 404, and that receives the IMU 406, as illustrated in FIGS. 7B and 7C. Alternatively, the single unit may have the multiple IMU embodiment shown in FIGS. 5A and 5B attached thereto.

The embodiment of FIGS. 7A-7C also differs from the embodiment described above in that the cup-shaped objects 202 are designed to be friction fit over the lug nuts 304 of the vehicle, or over only a subset of the lug nuts of the vehicle. For example, various models of the Ford® F150 truck have a six lug pattern. The embodiment of FIGS. 7A-7C provides four cup-shaped objects 202 that friction fit over four of the six lug nuts 304 in a manner similar to a conventional decorative center cap that is commercially available for such a vehicle. Instead of using magnets inside of the cup-shaped objects 202 for releasably attaching the apparatus to the lug nuts 304, the cup-shaped objects 202 include a plurality of slits or slots 700 which allow sidewall sections 702 of each cup-shaped object 202 to slightly flex outward to provide the friction fit. In the embodiment shown in FIGS. 7A-7C, each cup-shaped object 202 has four slits or slots 700 that define four sidewall sections 702.

The embodiment of FIGS. 7A-7C may also be able to accommodate different sized lug nut adaptors, such as illustrated in FIG. 2D. However, for such adaptors to work, the adaptors are preferably also constructed with matching slits or slots that align with the slits or slots 700 of the cup-shaped object 202, so that the sidewalls of the two parts (i.e., the adaptor and the cup-shaped object 202) slightly flex outward in unison to provide the friction fit.

In the embodiments described above, the IMU's are rigidly attached to the disk 100 so that they rotate with the disk 100 when the vehicle is in motion.

In alternative embodiments, the IMU's are mounted to the disk 100 in a manner that allows them to remain relatively stationary, in a manner similar to a hubometer (also, known as a hubodometer). These embodiments are referred to more generally as having a "non-rotating IMU" and as having a "floating center shaft assembly." These embodiments are all described with respect to a single IMU 406 mounted in a center of the disk 100. For ease of nomenclature, the combination of the disk 100 and the cup-shaped objects 202 is referred to as "wheel-mounted assembly 602."

Figure 6A:
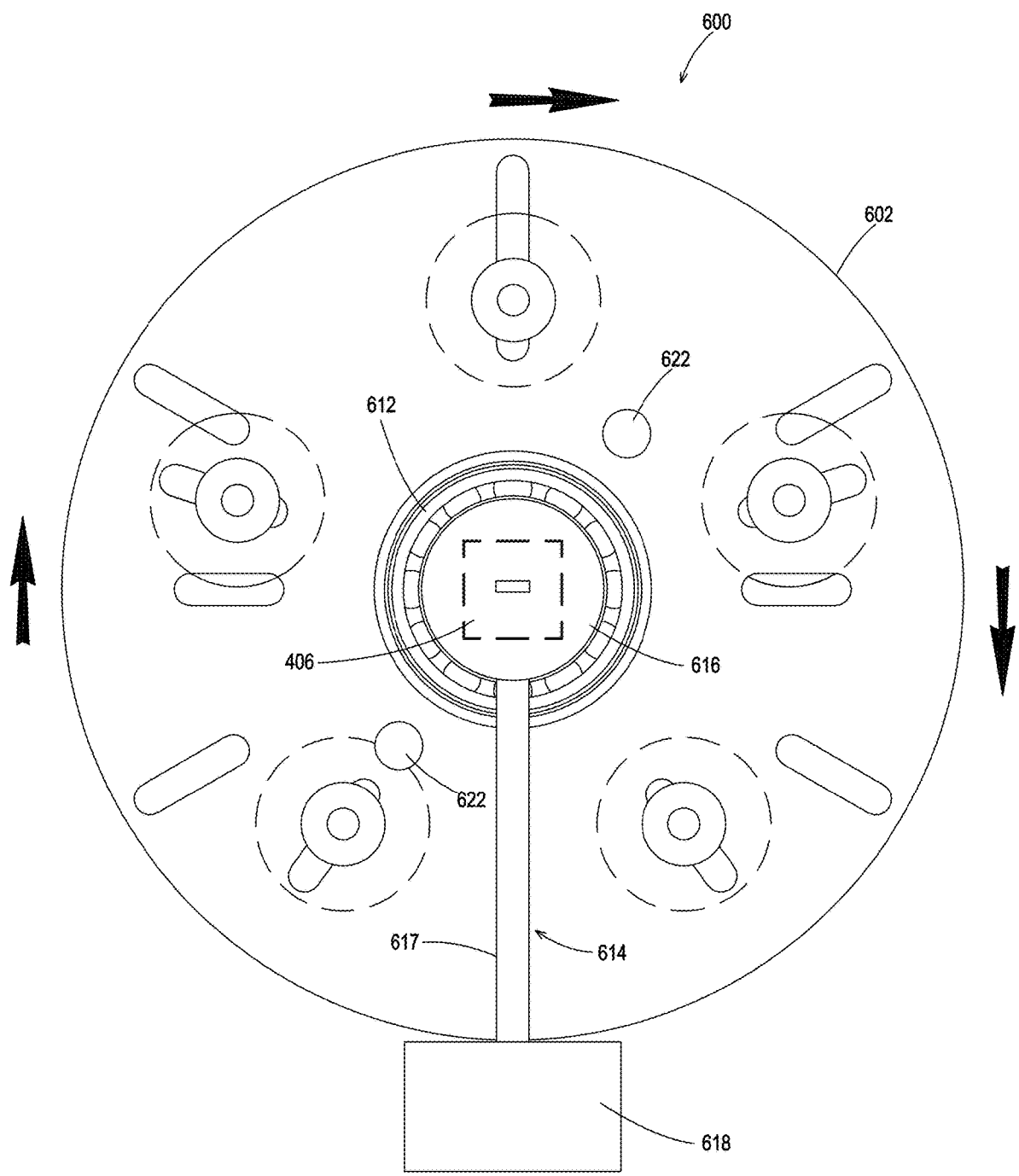
Figure 6B:
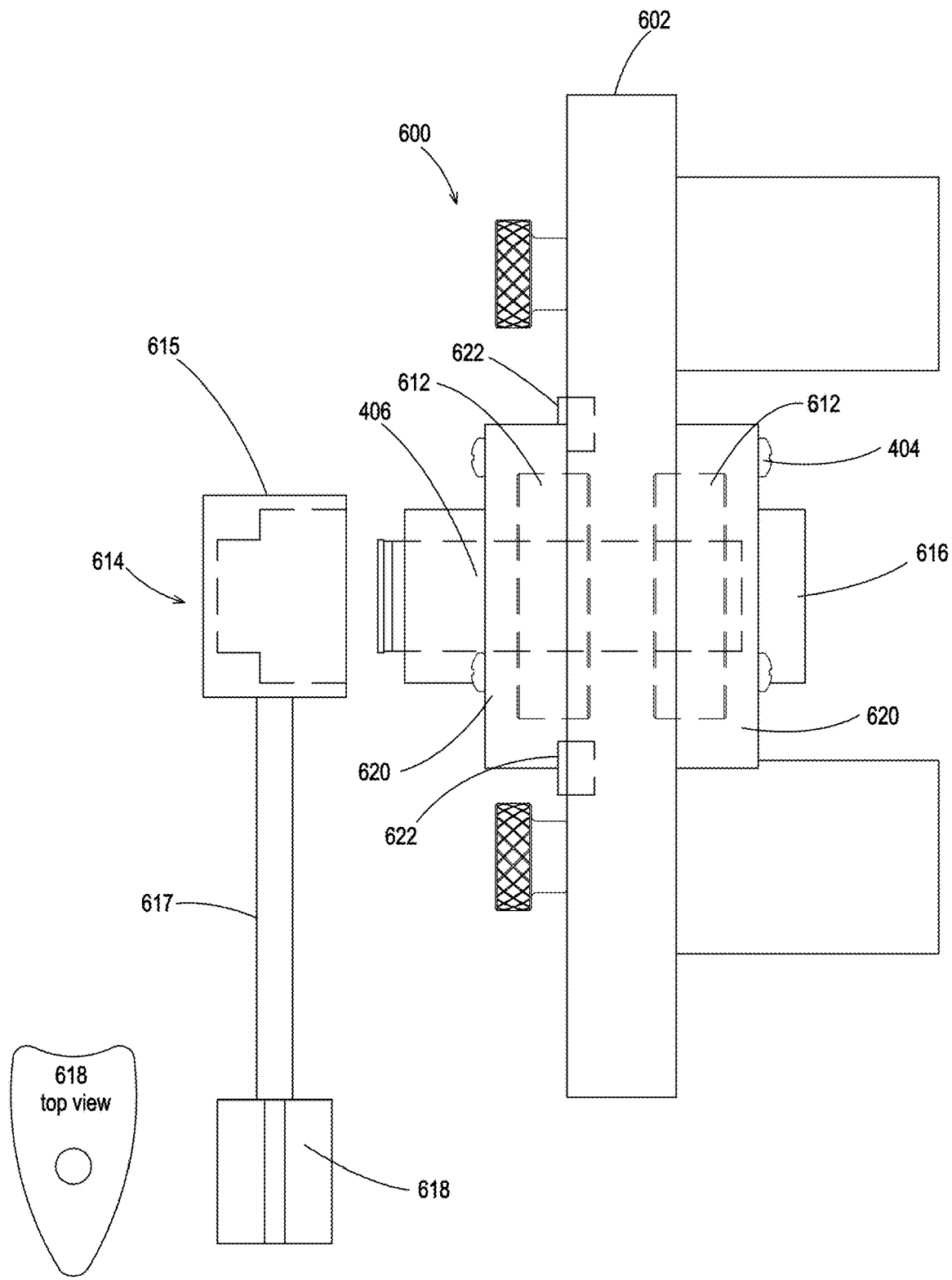
Figure 6C:
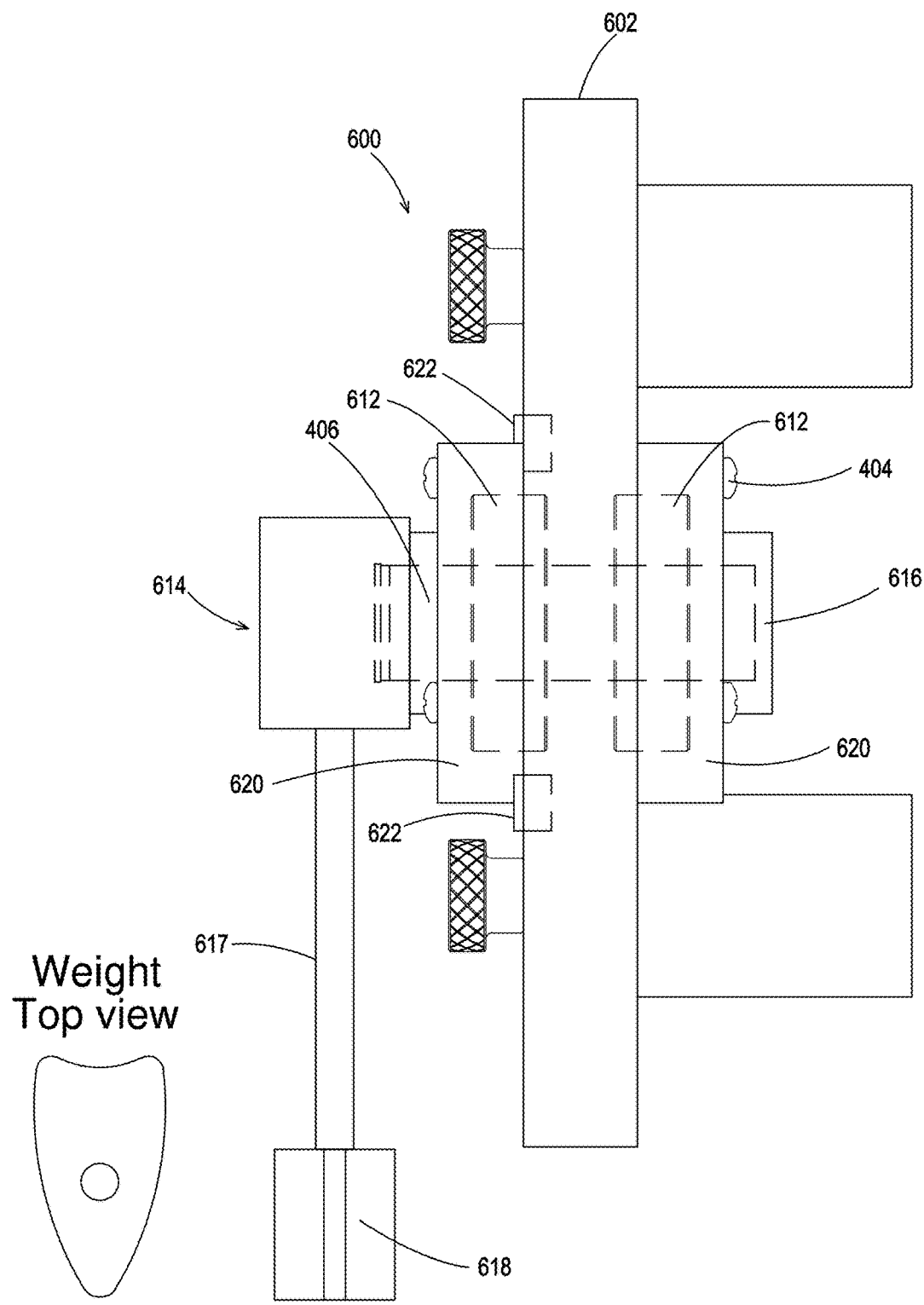

FIGS. 6A-6C show one embodiment of an apparatus 600 that includes a non-rotating IMU/floating center shaft assembly. A floating center shaft 616 extends through a center of the wheel-mounted assembly 602. Two sets of bearings 612, shown in phantom in FIGS. 6B and 6C, are provided within the floating center shaft 616. The bearings 612 are inside of bearing cap 620. A weight stabilization assembly 614 includes a hub portion 615 that is attached to the distal end of the floating center shaft 616, a downward facing shaft 617 (meaning, downward facing when in operation) which can be rigid or flexible, and a contoured weight 618 fixed to a distal end of the downward facing shaft 617. A top view of the contoured weight 618 is also shown in a separate figure within FIGS. 6B and 6C. The non-rotating IMU 406 is attached to weight stabilization assembly 614 in the center of wheel-mounted assembly 602, as shown in phantom in FIG. 6A.

In one preferred embodiment, the disk portion of the wheel-mounted assembly 602 further includes a pair of magnets 622 mounted thereon in an opposed manner along a radial line extending through the radial center of the wheel-mounted assembly 60, that is, a fixed radial distance from the radial center of the disk portion. In this embodiment, the IMU 406 further includes a Hall effect sensor (not shown) that works in conjunction with the magnets to measure rotational speed of the wheel-mounted assembly 602 during motion of the vehicle.

FIG. 6A is a front elevation view of the apparatus 600. FIG. 6B is a side elevation view of the apparatus 600 and shows the weight stabilization assembly 614 exploded from the wheel-mounted assembly 602 and the floating center shaft 616. FIG. 6C is also a side elevation view of the apparatus 600 and shows the weight stabilization assembly 614 attached to the wheel-mounted assembly 602 and the floating center shaft 616.

Figure 6D:
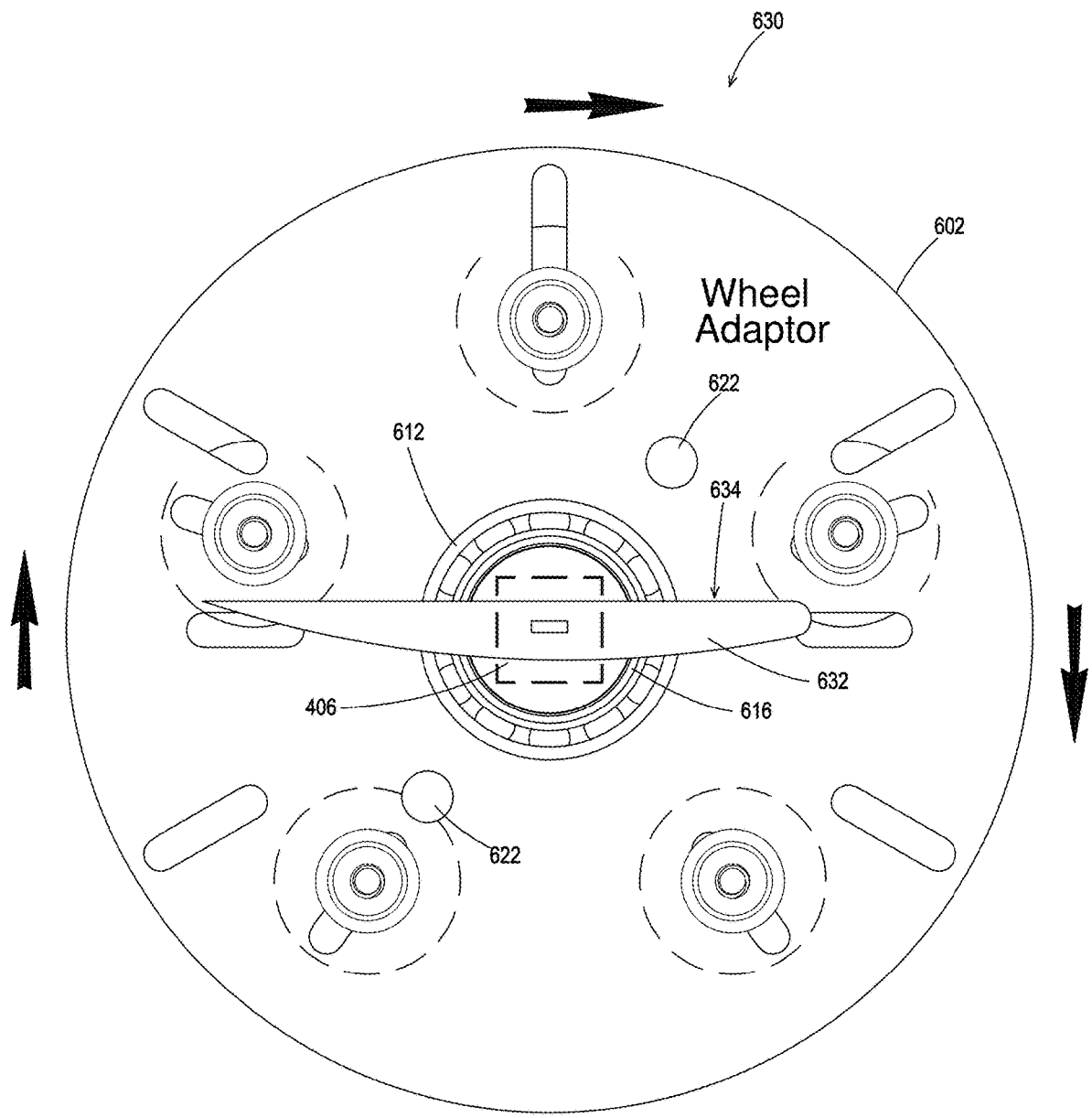
Figure 6E:
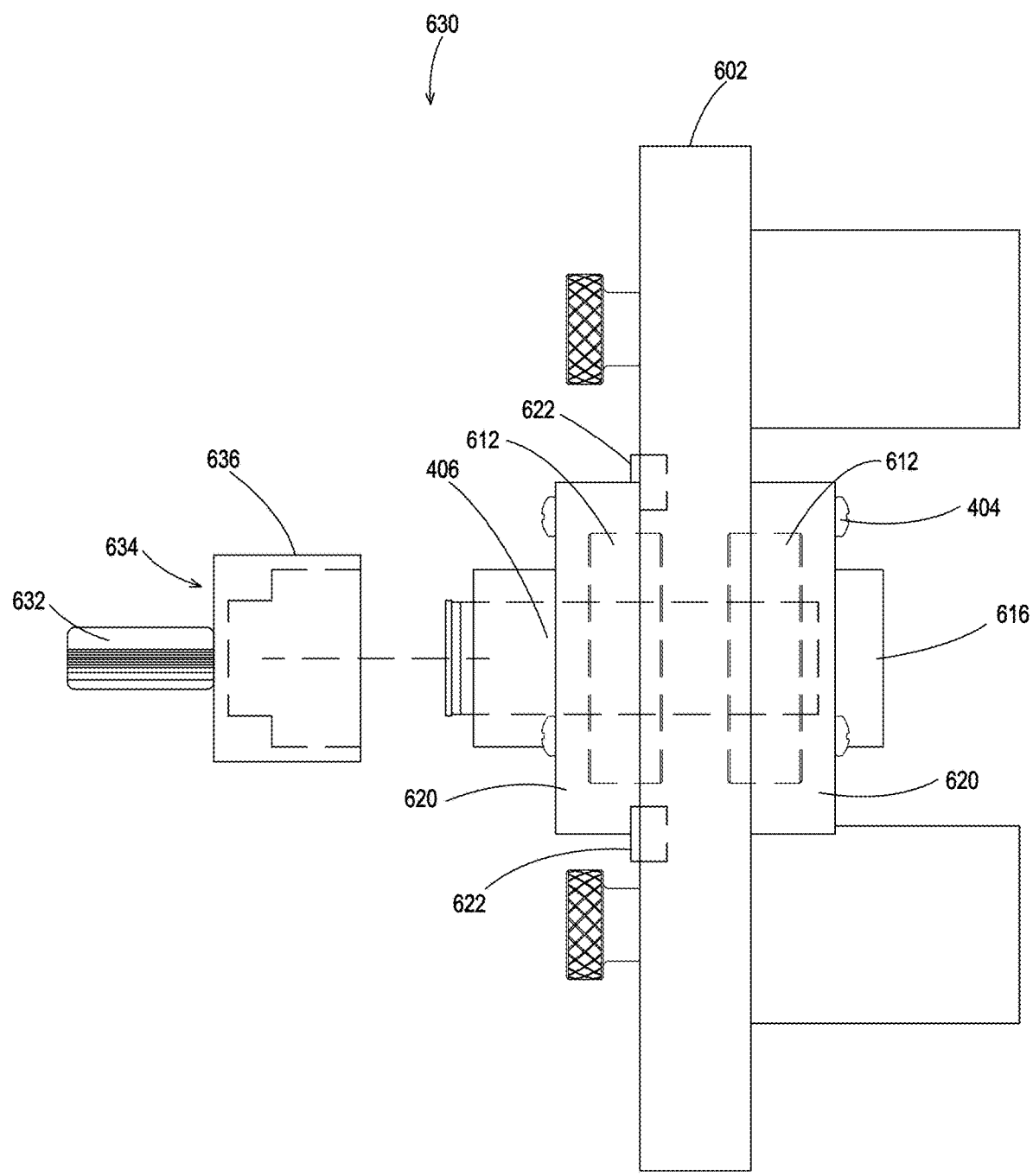
Figure 6F:
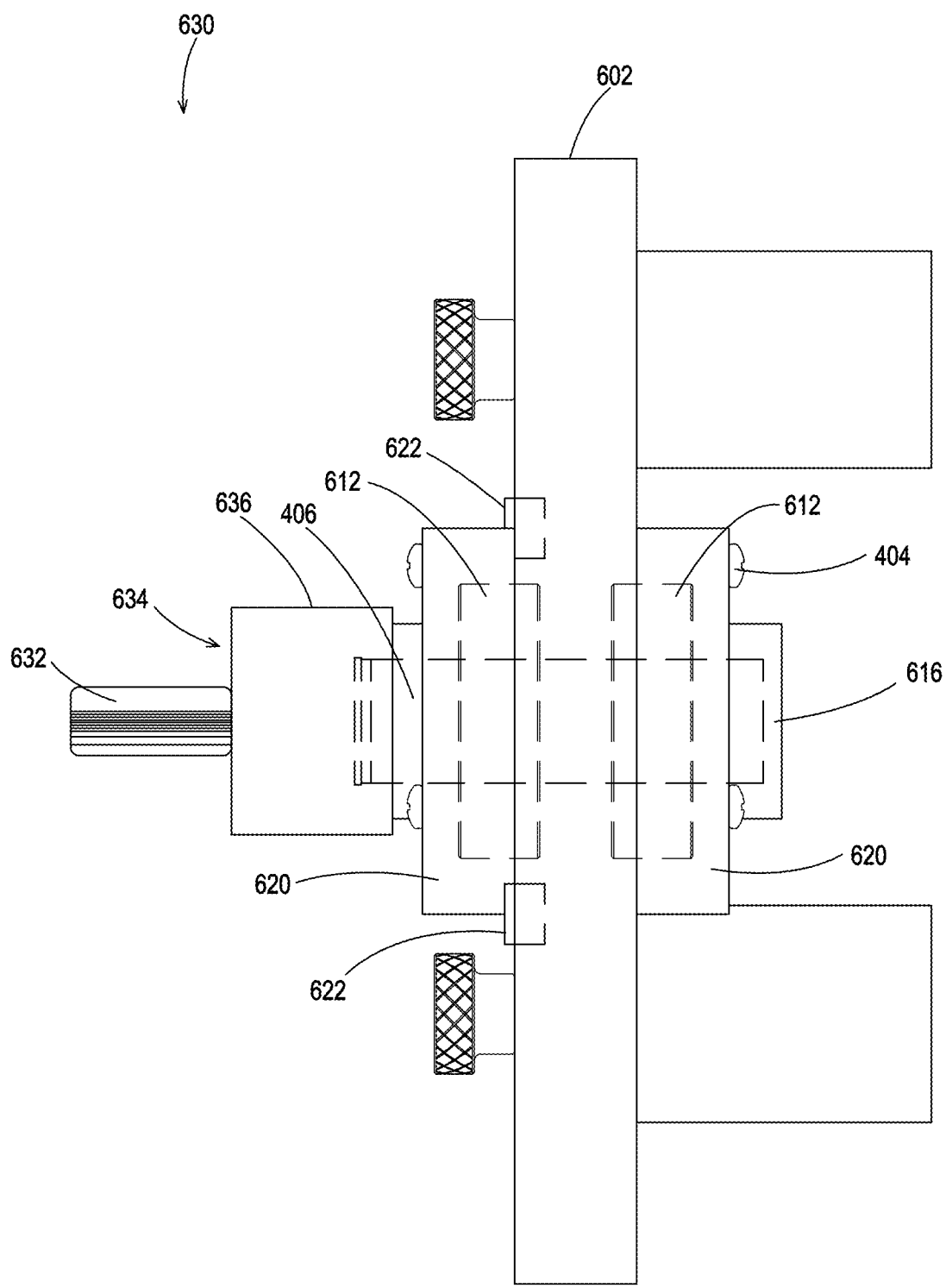

FIGS. 6D-6F show another embodiment of an apparatus 630 that also includes a non-rotating IMU/floating center shaft assembly. This embodiment is similar to the embodiment of FIGS. 6A-6C, except that it relies upon an airfoil stabilizing structure 634, instead of the weight stabilization assembly 614, for stabilization of the IMU 406. The airfoil stabilizing structure 634 comprises hub portion 636 and airfoil 632. The hub portion 636 and the airfoil 632 perform comparable functions as the hub portion 615 and the contoured weight 618 of the embodiment in FIGS. 6A-6C. The geometry of the airfoil stabilizing structure 634 is an example representation only.

FIG. 6D is a front elevation view of the apparatus 630. FIG. 6E is a side elevation view of the apparatus 630 and shows the airfoil stabilizing structure 634 exploded from the wheel-mounted assembly 602 and the floating center shaft 616. FIG. 6C is also a side elevation view of the apparatus 600 and shows the airfoil stabilizing structure 634 attached to the wheel-mounted assembly 602 and the floating center shaft 616.

Figure 6G:
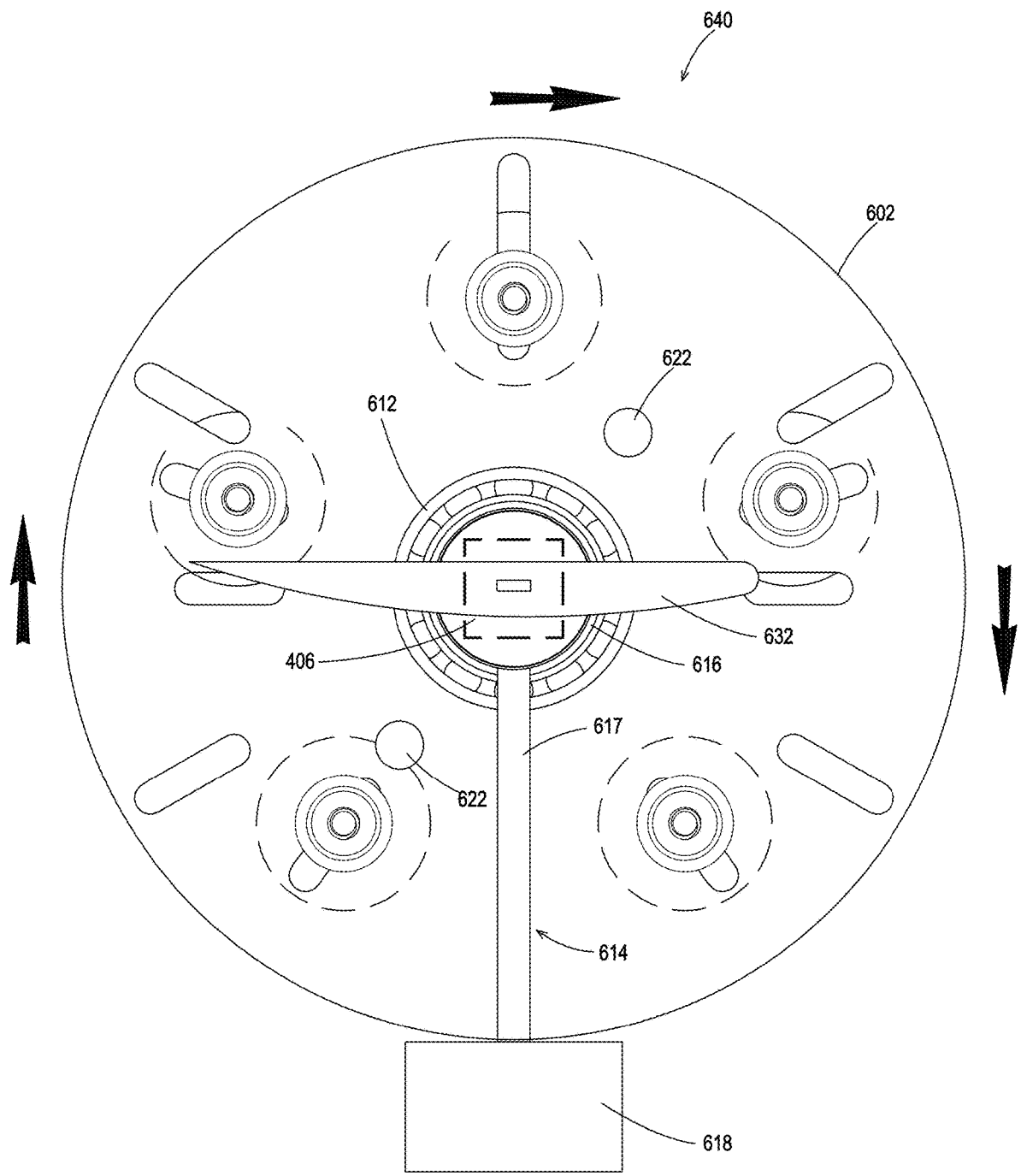
Figure 6H:
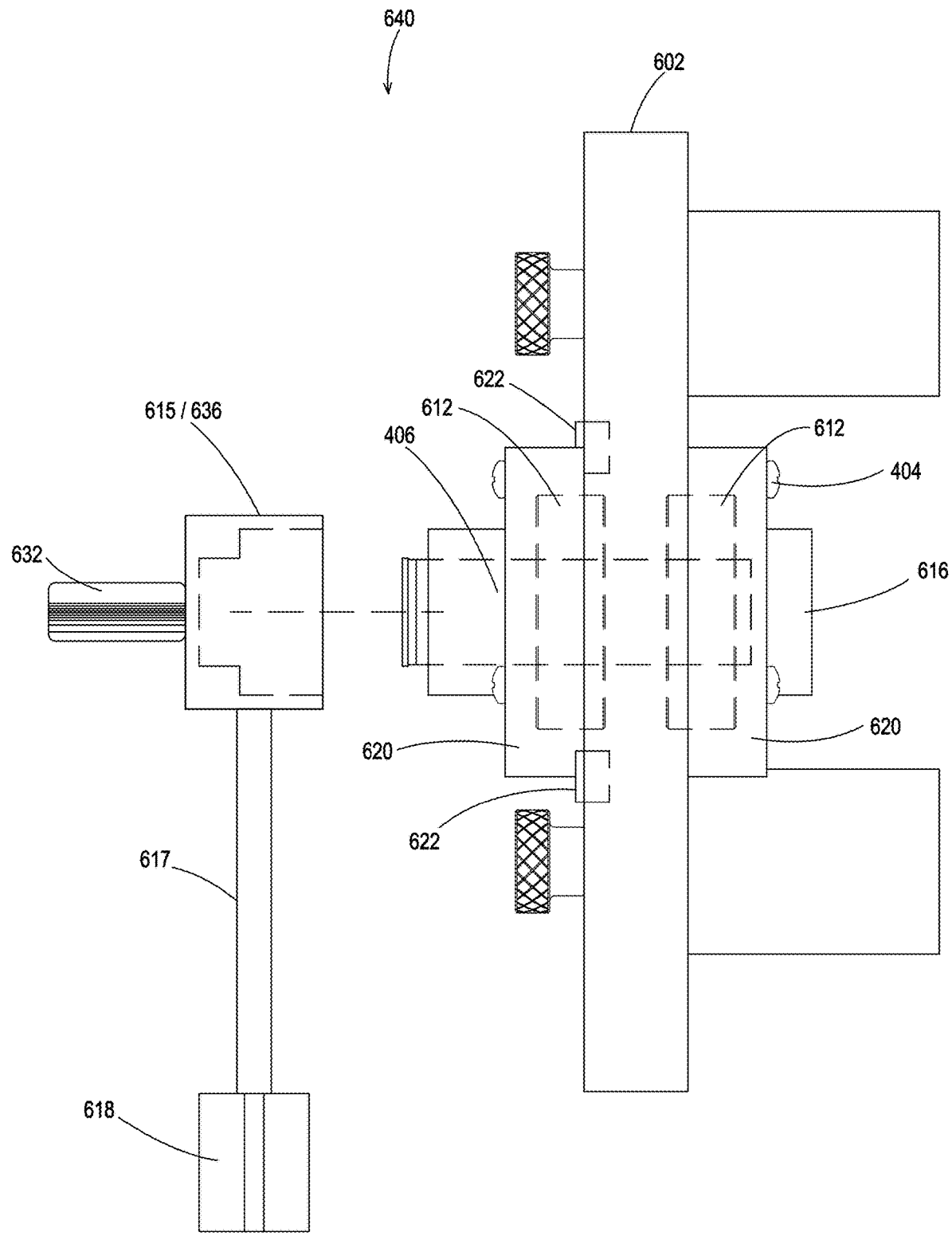
Figure 6I:
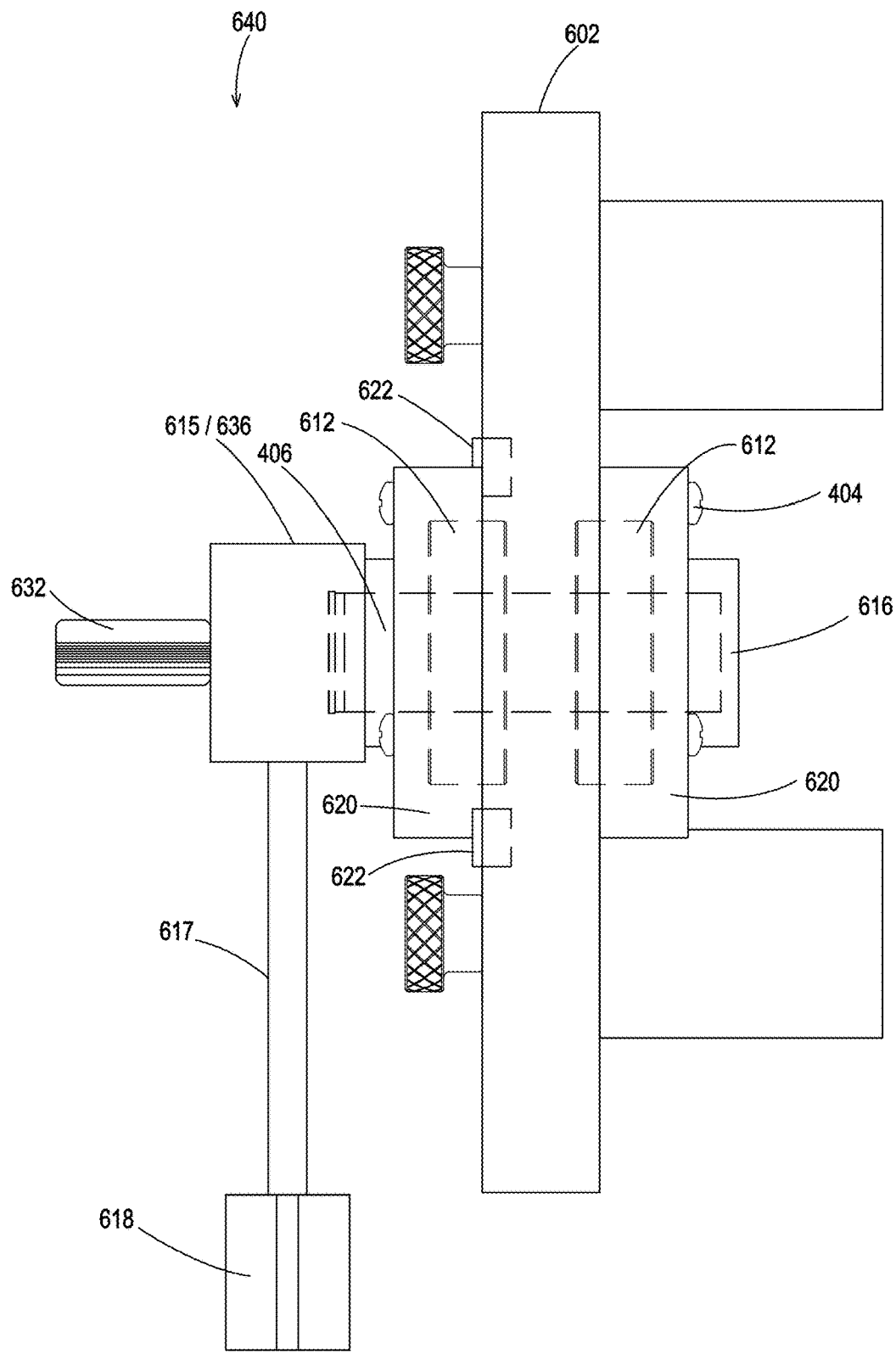

FIGS. 6G-6I show another embodiment of an apparatus 640 that also includes a non-rotating IMU/floating center shaft assembly. This embodiment includes both of the stabilizing structures shown in FIGS. 6A-6C and 6D-6F. These figures are thus self-explanatory in view of the descriptions above of the two respective embodiments. The same hub portion is used for both stabilizing structures, and thus this element is labeled as hub portion 615/636. The three different views in FIGS. 6G-6I are similar to the three different views of FIGS. 6A-6C and 6D-6F, and thus are not described further. The embodiment of FIGS. 6G-6I is also shown with the magnets 622.

FIG. 6J shows a front and side elevation view of only the weight stabilization assembly 614 used in FIGS. 6A-6C. FIG. 6K shows a front and side elevation view of only the airfoil stabilizing structure 634 used in FIGS. 6D-6F. FIG. 6L shows a front and side elevation view of the combined weight stabilization assembly 614 and airfoil stabilizing structure 634 used in FIGS. 6G-6I.

Figure 8A:
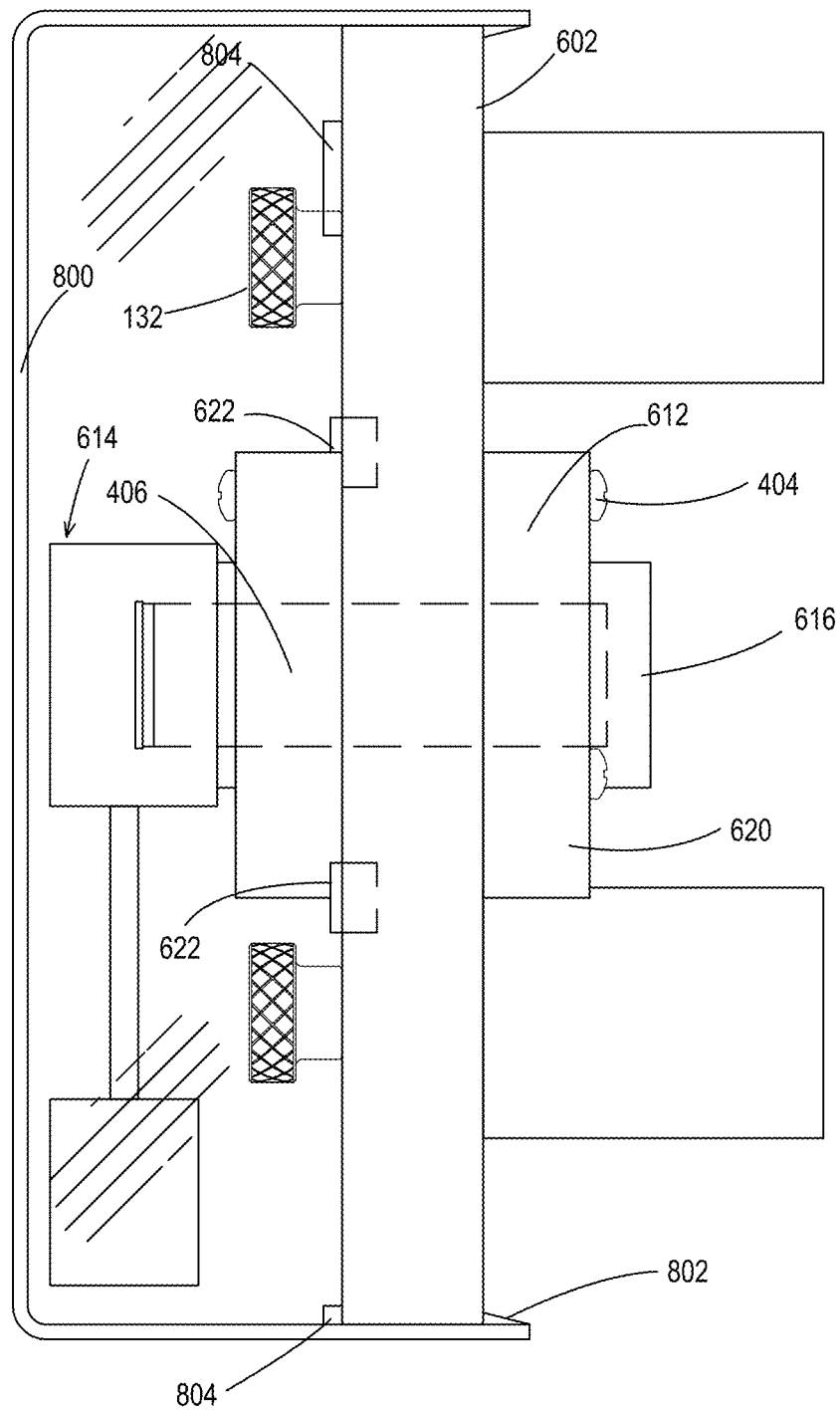
FIGS. 8A and 8B show a cover that may be placed over the wheel-mounted assembly of FIGS. 6A-6F.
Figure 8B:
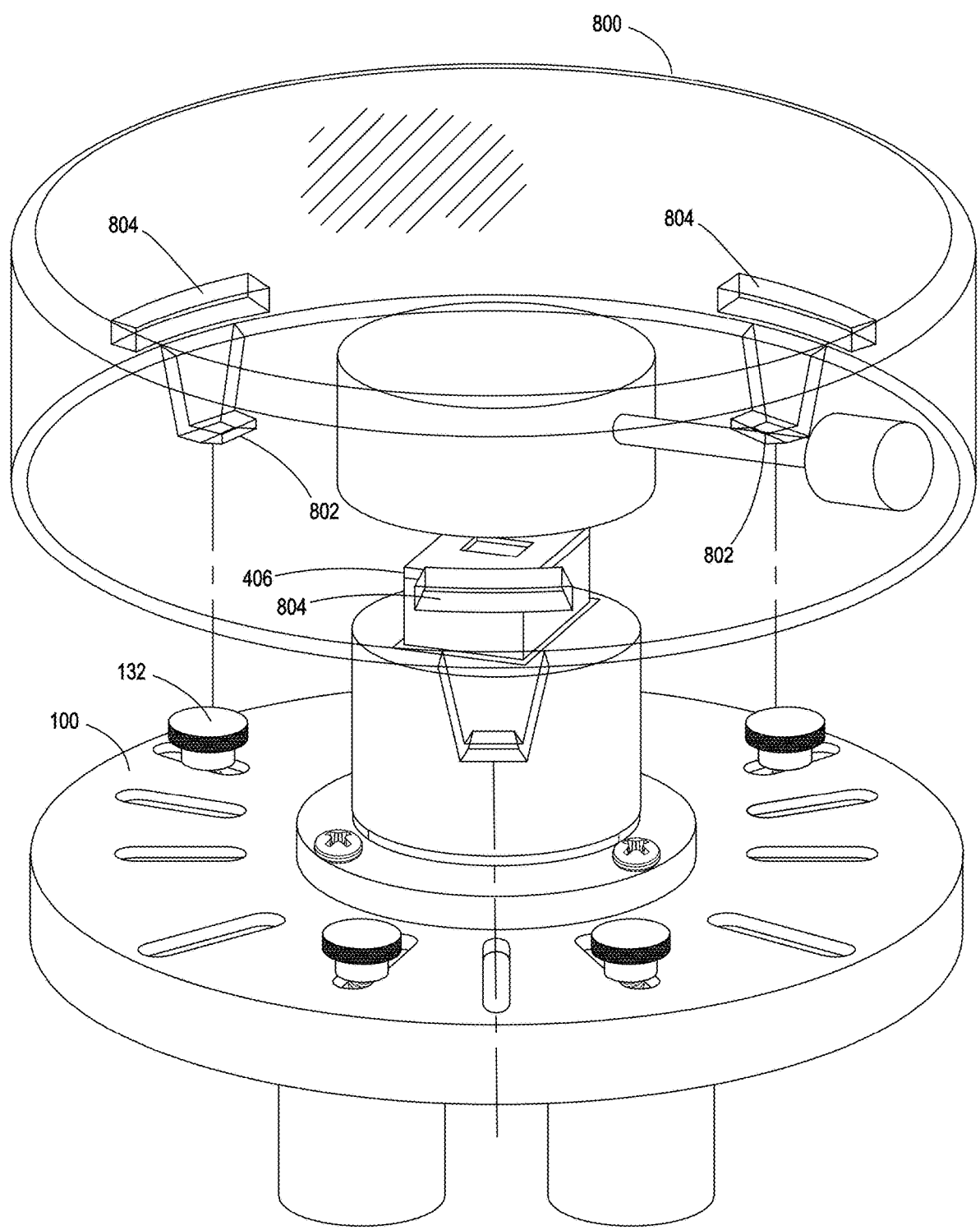

FIGS. 8A and 8B show a clear cover 800 that may be placed over the wheel-mounted assembly 602 shown in FIGS. 6A-6C to reduce road turbulence that may cause the stationary IMU 406 to oscillate. The cover 800 may be secured to the wheel-mounted assembly 602 via cover tabs 802 that are molded into cover 800. A similar type of cover 800 may also be used with the embodiment FIGS. 6D-6F. The cover tabs 802 snap over the back of the wheel-mounted assembly 602 to secure it in place. Inside of the cover 800, approximately ⅜" from the opening, are three raised stops 804 that rest on the front side of the wheel-mounted assembly 602. The stops 804 keep the cover 800 in the required position over the wheel-mounted assembly 602, preventing the cover 800 from making contact with the weight stabilization assembly 614.

In one preferred embodiment, the cup-shaped objects 202 are cylindrically shaped, and define cylinders having solid circumferential sidewalls. However, the cup-shaped objects 202 can have other shapes, such as square or octagonal, since other shapes would still allow them to releasably engage lug nuts, particularly when using the magnetic attachment embodiment. Likewise, the lug nut adapters may have a suitable internal diameter shape so as to snugly fit over the lug nuts, while having a different external diameter shape to conform to the shape of the cup-shaped objects 202.

In selected embodiments disclosed above, the cup-shaped objects 202 are rigidly fixed to the disk 100 via threaded bolts, such as thumbscrews. However, other ways to fasten the cup-shaped objects 202 to the disk 100 are within the scope of the invention, such as nuts and bolts, and adhesives. In an alternative embodiment, an integrally formed thread may extend from a distal end of the cup-shaped object 202, and the cup-shaped object 202 may be fastened to the disk by inserting the thread through the hole in the disk 100 and fastening it using a nut on the opposite side of the disk 100.

In other embodiments, such as shown in FIGS. 7A-7C, the cup-shaped objects 202 and the disk 100 are formed as a unitary piece, and thus no fastening mechanism is needed.

The magnetic attachment embodiment is only one preferred structure for removably attaching the apparatus to the tire/hub assembly of the vehicle via the lug nuts of the tire/hub assembly. The scope of the present invention includes other attachment mechanisms that rely upon physical (as opposed to magnetic) attachment of the apparatus to the tire/hub assembly of the vehicle via the lug nuts of the tire/hub assembly, such as clamping mechanisms, and other types of physical fastening mechanisms.

Any IMU may be used that has a form factor and durability suitable for the environment described herein. One suitable IMU is the IMU described in U.S. Pat. No. 10,284,752 (Canfield et al.), which is incorporated herein by reference. Sample measured parameters that are used for calculating the imbalance forces during motion of the vehicle include, and which are captured by the IMU's include, but are not limited to, acceleration and angular rotation. The data captured by the IMU may then be used for at least the following purposes:
   i. Determine where correction weights should be attached to the rim of the wheel to achieve improved balancing of the tire/hub assembly.
   ii. Determine if the tire/hub assembly is so far out of balance that normal balancing (adding of correction weights) cannot correct the imbalance.

In use, the different embodiments of the apparatuses (referred to herein in the singular) are removably attached to a tire/hub assembly of a vehicle via lug nuts of the tire/hub assembly. The vehicle is then driven on a road surface, and during motion of the vehicle, parameters measured by the one or more inertial measurement units (IMU's) mounted to the disk of the apparatus are collected, and then subsequently used for calculating the imbalance forces.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An apparatus configured to be removably attached to a tire/hub assembly of a vehicle via lug nuts of the tire/hub assembly for use in determining imbalance forces of the tire/hub assembly during motion of the vehicle, the apparatus comprising:
   (a) a disk;
   (b) a plurality of cup-shaped objects, each of the cup-shaped objects being rigidly fixed at one end to the disk and extending perpendicularly outward from the disk, the plurality of cup-shaped objects being arranged a fixed radial distance from a radial center of the disk in a pattern that matches the lug nuts of the tire/hub assembly, each of the cup-shaped objects being hollow along at least a portion of its length that is distal from the disk, the hollow portion defining an inner diameter of each of the cup-shaped objects, the inner diameter being larger than an outer diameter of the lug nuts of the tire/hub assembly so as to allow the apparatus to be mounted to the vehicle's tire/hub assembly by fitting the plurality of cup-shaped objects over the lug nuts of the tire/hub assembly; and
   (c) three inertial measurement units (IMU's) mounted to the disk and configured to measure parameters that are used for calculating the imbalance forces during motion of the vehicle.

2. The apparatus of claim 1 wherein the disk includes a plurality of holes that define a lug nut patterns so as to allow the plurality of cup-shaped objects to be rigidly fixed to the disk in locations that correspond with the lug nut pattern.

3. The apparatus of claim 2 wherein each of the cup-shaped objects includes a hole at the one end, and each of the cup-shaped objects are removably attached to the disk via a fastener extending through one of the holes in the disk and also through the hole at the one end of the cup-shaped object.

4. The apparatus of claim 3 wherein the fastener is a threaded bolt, and the hole in the one end of the cup-shaped object includes threads for receiving the threaded bolt.

5. The apparatus of claim 1 wherein each of the cup-shaped objects are cylindrically shaped.

6. The apparatus of claim 5 wherein each of the cup-shaped objects are cylinders having solid circumferential sidewalls.

7. The apparatus of claim 1 wherein the disk includes a plurality of holes that define a plurality of different sets of lug nut patterns so as to allow each of the cup-shaped objects to be rigidly fixed to the disk in locations that correspond with the lug nut pattern of the tire/hub assembly of the vehicle that the apparatus is removably attached to.

8. The apparatus of claim 7 wherein the plurality of holes are slot-shaped.

9. The apparatus of claim 1 wherein the three IMU's are arranged in an equilateral triangle configuration.

10. The apparatus of claim 9 wherein each IMU is equidistant from a radial center of the disk, each IMU thereby being placed at 120 degree angles from the radial center of the disk.

11. A method for collecting measurement parameters related to imbalance forces of a tire/hub assembly of a vehicle during motion of the vehicle on a road surface, the method comprising:
   (a) removably attaching an apparatus to the tire/hub assembly of the vehicle via lug nuts of the tire/hub assembly, the apparatus including:
      (i) a disk,
      (ii) a plurality of cup-shaped objects, each of the cup-shaped objects being rigidly fixed at one end to the disk and extending perpendicularly outward from the disk, the plurality of cup-shaped objects being arranged a fixed radial distance from a radial center of the disk in a pattern that matches the lug nuts of the tire/hub assembly, each of the cup-shaped objects being hollow along at least a portion of its length that is distal from the disk, the hollow portion defining an inner diameter of each of the cup-shaped objects, the inner diameter being larger than an outer diameter of the lug nuts of the tire/hub assembly so as to allow the apparatus to be mounted to the vehicle's tire/hub assembly by fitting the plurality of cup-shaped objects over the lug nuts of the tire/hub assembly, and (iii) three inertial measurement units (IMU's) mounted to the disk and configured to measure parameters that are used for calculating the imbalance forces during motion of the vehicle, the three IMU's being mounted to the disk a fixed radial distance from the radial center of the disk in an evenly spaced pattern, and wherein the three IMU's rotate with the disk during motion of the vehicle;

(b) driving the vehicle with the apparatus attached thereto on a road surface; and (c) collecting measured parameters from the three IMU's during motion of the vehicle on the road surface.

12. The method of claim 11 wherein the removably attached apparatus further includes:

(iv) a magnet fixedly mounted at an end of one or more of the cup-shaped objects proximate to the disk so as to magnetically engage with one of the lug nuts when the apparatus is attached to the tire/hub assembly of a vehicle, and thereby inhibit the apparatus from coming off of the vehicle when the vehicle is in motion.

* * * * *